US012633532B2

(12) United States Patent
Takemoto et al.

(10) Patent No.: US 12,633,532 B2
(45) Date of Patent: May 19, 2026

(54) LITHIUM METAL COMPOSITE OXIDE, POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

(71) Applicant: Sumitomo Metal Mining Co., Ltd., Tokyo (JP)

(72) Inventors: Marie Takemoto, Niihama (JP); Daisuke Nagao, Niihama (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 741 days.

(21) Appl. No.: 17/787,779

(22) PCT Filed: Dec. 22, 2020

(86) PCT No.: PCT/JP2020/047907
§ 371 (c)(1),
(2) Date: Jun. 21, 2022

(87) PCT Pub. No.: WO2021/132228
PCT Pub. Date: Jul. 1, 2021

(65) Prior Publication Data
US 2023/0069426 A1 Mar. 2, 2023

(30) Foreign Application Priority Data
Dec. 23, 2019 (JP) ................................. 2019-231325

(51) Int. Cl.
H01M 4/525 (2010.01)
H01M 4/02 (2006.01)
(Continued)

(52) U.S. Cl.
CPC ........... H01M 4/525 (2013.01); H01M 4/505 (2013.01); *H01M 2004/021* (2013.01); *H01M 2004/028* (2013.01); *H01M 10/0525* (2013.01)

(58) Field of Classification Search
CPC ................. H01M 4/525; H01M 4/505; H01M 10/0525; H01M 2004/021; H01M 2004/028
See application file for complete search history.

(56) References Cited

U.S. PATENT DOCUMENTS

2011/0027652 A1 2/2011 Morigaki
2013/0032753 A1 2/2013 Yamamoto et al.
(Continued)

FOREIGN PATENT DOCUMENTS

CN 101978533 A 2/2011
CN 103069621 A 4/2013
(Continued)

OTHER PUBLICATIONS

"Difference Between Average and Mean" https://byjus.com/maths/difference-between-average-and-mean/ (Year: 2025).*
(Continued)

*Primary Examiner* — Eugenia Wang
(74) *Attorney, Agent, or Firm* — Rimon P.C.

(57) ABSTRACT

The present invention relates to a lithium metal composite oxide represented by the composition formula (I), the lithium metal composite oxide satisfies requirements (1) to (3):
(1) a ratio ($I_1/I_2$) of an integral intensity $I_1$ of a diffraction peak in a range of $2\theta=36.7\pm1°$ with respect to an integral intensity $I_2$ of a diffraction peak in a range of $2\theta=64.9\pm1°$ in a powder X-ray diffraction measurement for the lithium metal composite oxide using Cu-Kα ray is 2.0 or more;
(2) a BET specific surface area is 0.7 m²/g or less; and
(Continued)

(3) a 10% cumulative volume particle size $D_{10}$ is 5 µm or more.

7 Claims, 2 Drawing Sheets

(51) Int. Cl.
  *H01M 4/505*   (2010.01)
  *H01M 10/0525*   (2010.01)

(56)       References Cited

U.S. PATENT DOCUMENTS

| | | | |
|---|---|---|---|
| 2013/0140488 A1 | 6/2013 | Sotowa et al. | |
| 2013/0157137 A1 | 6/2013 | Fukushima | |
| 2015/0380737 A1 | 12/2015 | Kawasato et al. | |
| 2016/0293950 A1 | 10/2016 | Kamata et al. | |
| 2017/0125808 A1 | 5/2017 | Blangero et al. | |
| 2018/0190982 A1 | 7/2018 | Fujino et al. | |
| 2019/0020020 A1 | 1/2019 | Zhou et al. | |
| 2019/0051900 A1 | 2/2019 | Yamaguchi et al. | |
| 2019/0296347 A1 | 9/2019 | Sakai | |
| 2019/0330072 A1 | 10/2019 | Imanari et al. | |
| 2019/0334170 A1 | 10/2019 | Takamori et al. | |
| 2021/0098776 A1 | 4/2021 | Kageura et al. | |
| 2022/0052337 A1 | 2/2022 | Nagao | |
| 2022/0059831 A1 | 2/2022 | Nagao | |
| 2022/0059834 A1 | 2/2022 | Kuroda | |

FOREIGN PATENT DOCUMENTS

| | | | |
|---|---|---|---|
| CN | 103081191 A | 5/2013 | |
| CN | 106463724 A | 2/2017 | |
| CN | 107851787 A | 3/2018 | |
| CN | 110072816 A | 7/2019 | |
| CN | 110192297 A | 8/2019 | |
| JP | 2009-266736 A | 11/2009 | |
| JP | 2010-165644 A | 7/2010 | |
| JP | 2011-181367 A | 9/2011 | |
| JP | 2011-198759 A | 10/2011 | |
| JP | 2015-003838 A | 1/2015 | |
| JP | 2015-099646 A | 5/2015 | |
| JP | 2015-197978 A | 11/2015 | |
| JP | 2016-026981 A | 2/2016 | |
| JP | 2017-525089 A | 8/2017 | |
| JP | 2018-138513 A | 9/2018 | |
| JP | 2019-021626 A | 2/2019 | |
| JP | 2019-172530 A | 10/2019 | |
| JP | 6600066 B1 | 10/2019 | |
| JP | 2020-100541 A | 7/2020 | |
| JP | 2020-102327 A | 7/2020 | |
| WO | 2015/189740 A1 | 12/2015 | |
| WO | 2017/204164 A1 | 11/2017 | |

OTHER PUBLICATIONS

Song Shunlin et al., "Preparation and characterization of ultrafine LiNi0.8Co0.2O2 powder by freeze-drying technique" Functional Materials, No. 3, pp. 449-452, Mar. 31, 2008.

M.M . Storm et al. "Capillary based Li-air batteries for in situ synchrotron X-ray powder diffraction studies", Journal of Materials Chemistry A, vol. 3, 6th, pp. 3113-3119, Mar. 11, 2015.

Chinese Office Action issued in corresponding Chinese Patent Application No. 202080088588.4, dated Jul. 24, 2023, with English translation.

International Search Report issued in corresponding International Patent Application No. PCT/JP2020/047907, dated Mar. 9, 2021, with English translation.

Japanese Notice of Reasons for Refusal issued in corresponding Japanese Patent Application No. 2019-231325, dated Sep. 13, 2022, with English translation.

* cited by examiner

LITHIUM METAL COMPOSITE OXIDE, POSITIVE ELECTRODE ACTIVE MATERIAL FOR LITHIUM SECONDARY BATTERY, POSITIVE ELECTRODE FOR LITHIUM SECONDARY BATTERY, AND LITHIUM SECONDARY BATTERY

CROSS REFERENCE TO RELATED APPLICATIONS

This application is the U.S. National Phase under 35 U.S.C. § 371 of International Application No. PCT/JP2020/047907, filed on Dec. 22, 2020, which claims the benefit of Japanese Application No. 2019-231325, filed on Dec. 23, 2019, the entire contents of each are hereby incorporated by reference.

TECHNICAL FIELD

The present invention relates to a lithium metal composite oxide, a positive electrode active material for a lithium secondary battery, a positive electrode for a lithium secondary battery, and a lithium secondary battery.

BACKGROUND ART

A lithium metal composite oxide is used as the positive electrode active material for a lithium secondary battery. Lithium secondary batteries have already been put to practical use not only in small power sources for mobile phones, laptop computers and the like, but also in medium-sized or large-sized power sources for automobiles, electricity storage applications and the like.

Various attempts have been made to improve the battery characteristics of lithium secondary batteries such as charge/discharge characteristics. For example, Patent Document 1 describes a spinel-type lithium manganese-containing composite oxide for the purpose of suppressing the gas generation amount by a reaction with an electrolytic solution.

CITATION LIST

Patent Document

[Patent Document 1] JP-A-2018-138513

SUMMARY OF INVENTION

Technical Problem

As the application field of lithium secondary batteries advances, the positive electrode active material for lithium secondary batteries is required to further reduce the gas generation amount.

The present invention has been made in view of the above circumstances, with an object of providing a lithium metal composite oxide that does not easily generate gas when used as a positive electrode active material for a lithium secondary battery, a positive electrode active material for a lithium secondary battery, a positive electrode for a lithium secondary battery, and a lithium secondary battery.

Solution to Problem

That is, the present invention includes the following inventions [1] to [7].

[1] A lithium metal composite oxide represented by the following composition formula (I), the lithium metal composite oxide satisfies requirements (1) to (3):

$$Li[Li_x(Ni_{1-y-z-w}Co_yMn_zM_w)_{1-x}]O_2 \tag{I}$$

wherein M is one or more elements selected from the group consisting of P, Fe, Cu, Ti, Mg, Al, W, B, Mo, Nb, Zn, Sn, Zr, Ga and V, and $-0.1 < x \leq 0.2$, $0 \leq y \leq 0.4$, $0 \leq z \leq 0.4$ and $0 \leq w \leq 0.1$ are satisfied;

(1) a ratio ($I_1/I_2$) of an integral intensity $I_1$ of a diffraction peak in a range of $2\theta = 36.7 \pm 1°$ with respect to an integral intensity $I_2$ of a diffraction peak in a range of $2\theta = 64.9 \pm 1°$ in a powder X-ray diffraction measurement for the lithium metal composite oxide using Cu-K$\alpha$ ray is 2.0 or more;

(2) a BET specific surface area is 0.7 $m^2/g$ or less; and (3) a 10% cumulative volume particle size $D_{10}$ is 5 $\mu$m or more.

[2] The lithium metal composite oxide according to [1], wherein a ratio ($D_{50}$/average primary particle diameter) of a 50% cumulative volume particle size $D_{50}$ with respect to an average primary particle diameter is 2.0 or less.

[3] The lithium metal composite oxide according to [1] or [2], wherein an average primary particle diameter is 4.5 $\mu$m or more.

[4] The lithium metal composite oxide according to any one of [1] to [3], wherein y is 0.5 times or more and 5 times or less of z in the composition formula (I).

[5] A positive electrode active material for a lithium secondary battery, which includes the lithium metal composite oxide of any one of [1] to [4].

[6] A positive electrode for a lithium secondary battery, which includes the positive electrode active material of [5].

[7] A lithium secondary battery including the positive electrode of [6].

Advantageous Effects of Invention

According to the present invention, it is possible to provide a lithium metal composite oxide that does not easily generate gas when used as a positive electrode active material for a lithium secondary battery, a positive electrode active material for a lithium secondary battery, a positive electrode for a lithium secondary battery, and a lithium secondary battery.

DESCRIPTION OF EMBODIMENTS

Figure 1A:
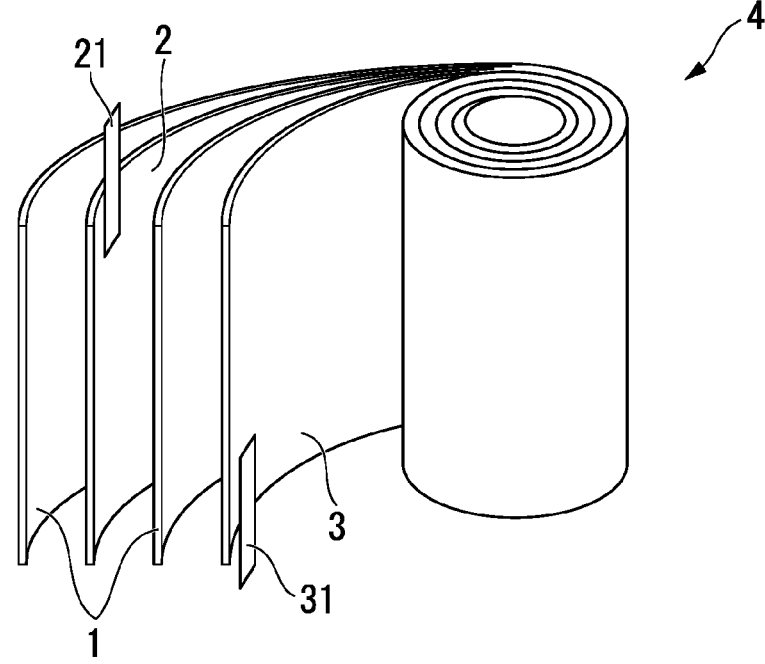
FIG. 1A is a schematic configuration diagram showing an example of a lithium ion secondary battery.

In the present specification, a metal composite compound is hereinafter referred to as "MCC", a lithium metal composite oxide is hereinafter referred to as "LiMO", and a positive electrode (cathode) active material for lithium secondary batteries is hereinafter referred to as "CAM".

<LiMO>

In the present embodiment, the "primary particles" mean particles having no grain boundaries in appearance when observed with a field of view of 5,000 times or more and 20,000 times or less using a scanning electron microscope (SEM) or the like.

In the present embodiment, the "secondary particles" are particles in which the primary particles are aggregated.

In other words, the "secondary particles" are aggregates of primary particles.

In one aspect of the present invention, the LiMO includes only primary particles.

In one aspect of the present invention, the LiMO is composed of secondary particles that are aggregates of primary particles and primary particles that are present independently of the secondary particles.

In one aspect of the present invention, the LiMO is in powder form.

When the LiMO is composed of secondary particles that are aggregates of primary particles and primary particles that are present independently of the secondary particles, a ratio of the number of primary particles with respect to the total number of secondary particles and primary particles that are present independently of the secondary particles contained in the LiMO is preferably 20% or more, more preferably 30% or more, and particularly preferably 50% or more. The upper limit is not particularly limited, and the ratio of the number of primary particles is less than 100%, and preferably 90% or less. The ratio of the number of primary particles is preferably 20% or more and less than 100%, more preferably 30% or more and 90% or less, and still more preferably 50% or more and 90% or less.

When calculating the number of primary particles, the primary particles that constitute the secondary particles are not counted, while only the number of primary particles that are present independently of the secondary particles are counted.

In the present embodiment, the ratio of the number of primary particles with respect to the total number of secondary particles and primary particles contained in the LiMO is determined by the following method.

First, the LiMO is placed on a conductive sheet attached onto a sample stage, and the primary particles and the secondary particles that are aggregates of the primary particles are dispersed so as to be present independently without contacting each other.

Then, SEM observation is carried out by radiating an electron beam with an accelerated voltage of 20 kV using a scanning electron microscope (SEM, for example, JSM-5510 manufactured by JEOLLtd.).

Next, 200 particles are randomly selected in an image (SEM photograph) obtained from the SEM observation, and 200 are taken as the total number of the secondary particles and the primary particles.

Next, the number of the primary particles that present independently of the secondary particles contained in the selected 200 particles is calculated.

By dividing the obtained number of primary particles by the total number of the secondary particles and the primary particles and multiplying by 100, the ratio of the number of primary particles with respect to the total number of the secondary particles and the primary particles is calculated.

The magnification of the SEM photograph may be a magnification that can specify the particle morphology of the target LiMO in the photograph, and the magnification is preferably 1000 times or more and 30,000 times or less.

The LiMO of the present embodiment is represented by the composition formula (I), and satisfies requirements (1) to (3).

<<Composition Formula>>

The LiMO of the present embodiment satisfies the following formula (I).

$$\text{Li}[\text{Li}_x(\text{Ni}_{1-y-z-w}\text{Co}_y\text{Mn}_z\text{M}_w)_{1-x}]\text{O}_2 \tag{I}$$

(wherein M is one or more elements selected from the group consisting of P, Fe, Cu, Ti, Mg, Al, W, B, Mo, Nb, Zn, Sn, Zr, Ga and V, and $-0.1 \leq x \leq 0.2$, $0 \leq y \leq 0.4$, $0 \leq z \leq 0.4$, and $0 \leq w \leq 0.1$ are satisfied.)

The composition analysis of LiMO is carried out using an inductively coupled plasma emission spectrophotometer (for example, SPS3000 manufactured by SII Nanotechnology Inc.) after the LiMO powder is dissolved in hydrochloric acid.

From the viewpoint of obtaining a lithium secondary battery having high cycle characteristics, x in the above composition formula (I) is preferably more than 0, more preferably 0.01 or more, and still more preferably 0.02 or more. Further, from the viewpoint of obtaining a lithium secondary battery having a higher initial coulombic efficiency, x in the above composition formula (I) is preferably 0.1 or less, more preferably 0.08 or less, and still more preferably 0.06 or less.

The upper limit values and lower limit values of x can be arbitrarily combined.

In the present embodiment, $0 < x \leq 0.1$ is preferable, $0.01 \leq x \leq 0.08$ is more preferable, and $0.02 \leq x \leq 0.06$ is still more preferable.

In the context of the present specification, the term "cycle performance" refers to a battery's ability to resist the capacity decrease due to repeated charge/discharge, which is defined in terms of a ratio of the capacity measured after charge/discharge to the initial capacity.

Further, from the viewpoint of obtaining a lithium secondary battery having a low internal resistance of the battery, y in the above composition formula (I) is preferably more than 0, more preferably 0.005 or more, still more preferably 0.01 or more, and particularly preferably 0.05 or more. Moreover, from the viewpoint of obtaining a lithium secondary battery having high thermal stability, y in the above composition formula (I) is preferably 0.35 or less, and more preferably 0.33 or less.

The upper limit values and lower limit values of y can be arbitrarily combined.

In the present embodiment, $0 < y \leq 0.4$ is preferable, $0.005 \leq y \leq 0.35$ is more preferable, $0.01 \leq y \leq 0.33$ is still more preferable, and $0.05 \leq y \leq 0.35$ is particularly preferable.

Further, from the viewpoint of obtaining a lithium secondary battery having high cycle characteristics, z in the above composition formula (I) is preferably 0.01 or more, more preferably 0.02 or more, and still more preferably 0.1 or more. Moreover, from the viewpoint of obtaining a lithium secondary battery having high storage stability at a high temperature (for example, in an environment of 60° C.), z in the above composition formula (I) is preferably 0.39 or less, more preferably 0.38 or less, and still more preferably 0.35 or less.

The upper limit values and lower limit values of z can be arbitrarily combined.

In the present embodiment, $0.01 \leq z \leq 0.39$ is preferable, $0.02 \leq z \leq 0.38$ is more preferable, and $0.1 \leq z \leq 0.35$ is still more preferable.

Further, from the viewpoint of obtaining a lithium secondary battery having a low internal resistance of the battery, w in the above composition formula (I) is preferably more than 0, more preferably 0.0005 or more, and still more preferably 0.001 or more. Moreover, from the viewpoint of obtaining a lithium secondary battery having a high discharge capacity at a high current rate, w in the above composition formula (I) is preferably 0.09 or less, more preferably 0.08 or less, and still more preferably 0.07 or less.

The upper limit values and lower limit values of w can be arbitrarily combined.

In the present embodiment, $0<w\leq0.09$ is preferable, $0.0005\leq w\leq0.08$ is more preferable, and $0.001\leq w\leq0.07$ is still more preferable.

In the present embodiment, from the viewpoint of obtaining a lithium secondary battery having a low internal resistance of the battery and having high cycle characteristics, y in the composition formula (I) is preferably 0.5 times or more and 5 times or less of z. y in the composition formula (I) is more preferably 0.7 times or more of z, and still more preferably 0.9 times or more of z. y in the composition formula (I) is more preferably 3 times or less of z, and still more preferably 2 times or less of z.

The upper limit values and lower limit values w can be arbitrarily combined.

As an example of the combination, y is 0.5 times or more and 3 times or less of z, y is 0.7 times or more and 5 times or less of z, or y is 0.7 times or more and 3 times or less of z.

M in the above composition formula (I) represents one or more elements selected from the group consisting of P, Fe, Cu, Ti, Mg. Al, W, B, Mo, Nb, Zn, Sn, Zr, Ga and V.

Further, M in the composition formula (I) is preferably one or more elements selected from the group consisting of Ti, Mg, Al, W, B and Zr for obtaining a lithium secondary battery with high cycle characteristics, M in the composition formula (I) is preferably one or more elements selected from the group consisting of Ti, Al, W, B and Zr for obtaining a lithium secondary battery with high thermal stability.

<<Requirements (1)>>

The LiMO of the present embodiment satisfies the following requirement (1).

Requirement (1); A ratio $(I_1/I_2)$ of an integral intensity $I_1$ of a diffraction peak in a range of $2\theta=36.7\pm1°$ with respect to an integral intensity $I_2$ of a diffraction peak in a range of $2\theta=64.9'\theta1°$ in a powder X-ray diffraction measurement for the LiMO using Cu-Kc ray is 2.0 or more. The integral intensity of the diffraction peak in a range of $2\theta=36.7\pm\theta1°$ (or $64.9\pm1°$) refers to an integral intensity of the diffraction peak having the maximum intensity in a range of $2\theta=36.7\pm1°$ (or $64.9\pm1°$).

The powder X-ray diffraction measurement can be carried out using an X-ray diffractometer (for example. UltimaIV, manufactured by Rigaku Corporation). Detailed measurement conditions will be described in Examples. The integral intensity $I_1$ and the integral intensity $I_2$ can be obtained by analyzing the obtained powder X-ray pattern with analysis software (for example, integrated powder X-ray analysis software JADE).

In the case where the LiMO belongs to the space group R-3m described later, the peak existing in the range of diffraction angle $2\theta=36.7\pm1°$ is the peak corresponding to the (101) plane of the unit cell, which is the smallest unit in the crystal structure.

In the case where the LiMO belongs to the space group R-3m described later, the peak existing in the range of diffraction angle $2\theta=64.9\pm1°$ is the peak corresponding to the $(I_{10})$ plane of the unit cell, which is the smallest unit in the crystal structure.

The lower limit of the ratio $(I_1/I_2)$ is more preferably 2.1, and still more preferably 2.3.

The upper limit of the ratio $(I_1/I_2)$ is preferably 3.5, more preferably 3.2, and still more preferably 2.9.

The upper limit values and lower limit values can be arbitrarily combined.

As an example of the combination, the ratio $(I_1/I_2)$ is 2.0 or more and 3.5 or less, 2.1 or more and 3.2 or less, or 2.3 or more and 2.9 or less.

Crystal growth can be understood by evaluating specific surface indexes among a plurality of surface indexes.

The (101) plane and the (110) plane are crystal planes in which the direction of crystal growth is different. Therefore, cracks are likely to occur at the boundary between the crystallite having a large growth of the (101) plane and the crystallite having a large growth of the (110) place when each crystallite expands and contracts due to the insertion/desorption of lithium ions. When the new surface generated by the crack comes into contact with the electrolytic solution, a decomposition reaction of the electrolytic solution occurs and gas is generated.

Examples of a scene where cracks are likely to occur include a scene where the crystallites expand and contract due to the insertion/desorption of lithium ions and stress is generated between the crystallites when charging and discharging a battery using the LiMO as a CAM.

The LiMO satisfying the requirement (1) has a large rate of crystal growth in the (101) plane direction. This indicates that the amount ratio of the above-mentioned boundaries is small. In such LiMO, cracks are unlikely to occur. That is, the LiMO satisfying the requirement (1) is less likely to generate a new surface in contact with the electrolytic solution, and is less likely to cause the decomposition reaction of the electrolytic solution.

When the LiMO satisfying the requirement (1) is used as the CAM, the gas generation amount in the battery due to the reaction with the electrolytic solution can be suppressed.

The decomposition electricity amount (hereinafter, may be referred to as "float electricity amount") is an index for evaluating the gas generation amount in the battery.

The float electricity amount is the electricity amount observed when an irreversible reaction with the electrolytic solution occurs at the particle interface. Specifically, the float electricity amount indicates the electricity amount when constant voltage charging is continuously performed for 30 hours when fully charged is set to 0.

The larger the value of the observed float electricity amount, the larger the gas generation amount.

<<Requirements (2)>>

The LiMO of the present embodiment satisfies the following requirement (2).

Requirement (2); A BET specific surface area is 0.7 m²/g or less.

In the present embodiment, the BET specific surface area is preferably 0.6 m²/g or less, more preferably 0.5 m²/g or less, still more preferably 0.3 m²/g or less, and particularly preferably less than 0.2 m²/g.

Further, the BET specific surface area is preferably 0.01 m²/g or more, more preferably 0.05 m²/g or more, and still more preferably 0.1 m²/g or more.

The upper limit values and lower limit values can be arbitrarily combined.

As an example of the combination, the BET specific surface area is preferably 0.01 m²/g or more and 0.6 m²/g or less, more preferably 0.05 $m^2/g$ or more and 0.5 $m^2/g$ or less, still more preferably 0.1 $m^2/g$ or more and 0.3 $m^2/g$ or less, and particularly preferably 0.1 $m^2/g$ or more and less than 0.2 $m^2/g$.

In the present embodiment, the LIMO satisfying the requirement (2) preferably contains primary particles having a smooth surface.

The BET specific surface area can be measured by using a BET specific surface area meter (for example, Macsorb (registered trademark) manufactured by MOUNTECH Co., Ltd.) after drying 1 g of LIMO powder at 105° C. for 30 min in a nitrogen atmosphere.

<<Requirements (3)>>

The LIMO of the present embodiment satisfies the following requirement (3).

Requirement (3); A 10% cumulative volume particle size $D_{10}$ is 5 μm or more.

[Measurement of $D_{10}$ and $D_{50}$]

The cumulative volume particle size is measured by the laser diffraction scattering method.

First, 0.1 g of a LiMO powder is added to 50 ml of 0.2% by mass aqueous solution of sodium hexametaphosphate, thereby obtaining a dispersion liquid with the powder dispersed therein.

Next, the particle size distribution of the obtained dispersion liquid is measured using a laser diffraction scattering particle size distribution measuring device (for example, Microtrac MT3300EXII manufactured by MicrotracBEL Corporation) to obtain a volume-based cumulative particle size distribution curve.

From the obtained cumulative particle size distribution curve, the value of the particle size at 10% cumulative volume measured from the smallest particle side is the 10% cumulative volume particle size $D_{10}$ (μm) (hereinafter, may be referred to as "$D_{10}$"). Further, the value of the particle size at 50% cumulative volume measured from the smallest particle side is the 50% cumulative volume particle size $D_{50}$ (μm) (hereinafter, may be referred to as "$D_{50}$").

The 10% cumulative volume particle size $D_{10}$ is preferably 5.0 μm or more, more preferably 5.2 μm or more, and still more preferably 5.4 μm or more.

Further, the 10% cumulative volume particle size $D_{10}$ is preferably 15 μm or less, more preferably 14 μm or less, and still more preferably 12 μm or less.

The upper limit values and lower limit values can be arbitrarily combined.

As an example of the combination, the 10% cumulative volume particle size $D_{10}$ is preferably 5.0 μm or more and 15 μm or less, more preferably 5.2 μm or more and 14 μm or less, and still more preferably 5.4 μm or more and 12 μm or less.

In the present embodiment, when the LiMO satisfies the requirement (3), it indicates that the amount of primary particles with a small particle diameter or secondary particles with a small particle diameter is small.

The LiMO satisfying the requirements (2) and (3), that is, having a small BET specific surface area and a small amount of primary particles with a small particle diameter or secondary particles with a small particle diameter, has a small contact area with the electrolytic solution. For this reason, the reaction with the electrolytic solution on the surface of the LIMO is suppressed. As a result, the decomposition reaction of the electrolytic solution is unlikely to occur, and the gas generation amount is reduced.

As described above, the LiMO satisfying the requirement (1) is less likely to generate cracks, so that a new surface in contact with the electrolytic solution is unlikely to occur and the decomposition reaction of the electrolytic solution is unlikely to occur. It is possible to obtain the LiMO in which the decomposition reaction of the electrolytic solution is unlikely to occur and the gas generation amount is reduced by further satisfying the requirements (2) and (3).

The 50% cumulative volume particle size $D_{50}$ is preferably 5 μm or more, more preferably 7 μm or more, and still more preferably 9 μm or more.

Further, the 50% cumulative volume particle size $D_{50}$ is preferably 30 μm or less, more preferably 25 μm or less, and still more preferably 20 μm or less.

The upper limit values and lower limit values can be arbitrarily combined.

As an example of the combination, the 50% cumulative volume particle size $D_{50}$ is preferably 5 μm or more and 7 μm or less, more preferably 7 μm or more and 25 μm or less, and still more preferably 9 μm or more and 20 μm or less.

[$D_{50}$/Average Primary Particle Diameter]

In the LiMO of the present embodiment, a ratio ($D_{50}$/average primary particle diameter) of the 50% cumulative volume particle size $D_{50}$ with respect to the average primary particle diameter is preferably 2.0 or less, more preferably 1.9 or less, and particularly preferably 1.5 or less.

Examples of the lower limit of the ratio ($D_{50}$/average primary particle diameter) includes 1.0, 1.1, and 1.2.

The upper limit values and lower limit values can be arbitrarily combined.

As an example of the combination, the ratio ($D_{50}$/average primary particle diameter) is preferably 1.0 or more and 2.0 or less, more preferably 1.1 or more and 1.9 or less, and still more preferably 1.2 or more and 1.5 or less.

When the ratio ($D_{50}$/average primary particle diameter) is 2.0 or less, it indicates that the average primary particle diameter is relatively large with respect to $D_{50}$. The LiMO having the ratio ($D_{50}$/average primary particle diameter) of 2.0 or less has a small BET specific area and a reduced contact surface with the electrolytic solution, so that gas is less likely to be generated.

[Measurement of Average Primary Particle Diameter]

In the present embodiment, the average primary particle diameter of the LiMO is determined by the following method.

First, the LiMO powder is placed on a conductive sheet attached onto a sample stage, and SEM observation is carried out by radiating an electron beam with an accelerated voltage of 20 kV using a scanning electron microscope (SEM, for example, JSM-5510 manufactured by JEOL Ltd). 50 primary particles in the visual field are randomly selected in an image (SEM photograph) obtained from the SEM observation, parallel lines are drawn from a certain direction so as to sandwich the projection image of each primary particle, and the distance between the parallel lines (Feret diameter) is measured as the primary particle diameter. As the primary particle diameter, parallel lines are drawn from a certain direction so as to sandwich the projection image of each primary particle, and the average of the maximum distance and the minimum distance between the parallel lines can be adopted. When the number of primary particles in the visual field is less than 50, another visual field is observed until the number of primary particles reaches 50, and 50 primary particles are selected.

The arithmetic average value of the obtained primary particle diameters is the average primary particle diameter of the LiMO. The magnification of the SEM photograph may be a magnification that can measure the primary particle diameter of the target LiMO particles, and the magnification is preferably 1,000 times or more and 30,000 times or less.

In the present embodiment, the average primary particle diameter of the LiMO is preferably 4.5 μm or more, more preferably 5.0 μm or more, and still more preferably 6.0 μm or more.

The average primary particle diameter of the LiMO is preferably 20 μm or less, more preferably 19 μm or less, and still more preferably 16 μm or less.

The upper limit values and lower limit values can be arbitrarily combined.

As an example of the combination, the average primary particle diameter of the LiMO is preferably 4.5 μm or more and 20 μm or less, more preferably 5.0 μm or more and 19 μm or less, and still more preferably 6.0 μm or more and 16 μm or less.

(Layered Structure)

In the present embodiment, the crystal structure of LiMO is a layered structure, and is more preferably a hexagonal crystal structure or a monoclinic crystal structure.

The hexagonal crystal structure belongs to any one of the space groups selected from the group consisting of P3, $P3_1$, $P3_2$, R3, P-3, R-3, P312, P321, $P3_1$12, $P3_1$21, $P3_2$12, $P3_2$21, R32, P3m1, P31 μm, P3c1, P31c, R3 μm, R3c, P-31 μm, P-31c, P-3m1, P-3c1, R-3 μm, R-3c, P6, $P6_1$, $P6_5$, $P6_2$, $P6_4$, $P6_3$, P-6, P6/m, P63/m, P622, $P6_1$22, $P6_5$22, $P6_2$22, $P6_4$22, $P6_3$22, P6mm, P6cc, P63cm, P63mc, P-6m2, P-6c2, P-62m, P-62c, P6/mmm, P6/mcc, $P6_3$/mcm and $P6_3$/mmc.

Further, the monoclinic crystal structure belongs to any one of space groups selected from the group consisting of P2, $P2_1$, C2, Pm, Pc, Cm, Cc, P2/m, $P2_1$/m, C2/m, P2/c, $P2_1$/c and C2/c.

Of these, in order to obtain a lithium secondary battery with a high discharge capacity, the crystal structure is particularly preferably a hexagonal crystal structure belonging to a space group of R-3m or a monoclinic crystal structure belonging to a space group of C2/m.

The crystal structure of LiMO can be confirmed by X-ray diffraction measurement of LiMO powder.

<Method for Producing LiMO>

A method for producing LiMO according to the present embodiment will be described.

The method for producing LiMO according to the present embodiment is preferably a production method including the following steps (1), (2), and (3) in this order.

(1) A step of producing a precursor of LiMO.

(2) A mixing step of mixing the aforementioned precursor and a lithium compound to obtain a mixture.

(3) A step of calcining the aforementioned mixture to obtain LiMO.

[Step of Producing Precursor of LiMO]

First, a nickel-containing MCC that contains a metal other than lithium, that is, nickel as an essential metal and an optional element M such as cobalt and manganese is prepared. As the nickel-containing MCC serving as a precursor, a nickel-containing metal composite hydroxide or a nickel-containing metal composite oxide can be used.

The precursor can be produced by a commonly known batch coprecipitation method or continuous coprecipitation method. Hereinafter, the production method thereof will be described in detail, using as an example a nickel-containing metal composite hydroxide (hereinafter, may be described as "metal composite hydroxide") containing nickel and, as the element M, cobalt and manganese.

First, a nickel salt solution, a cobalt salt solution, a manganese salt solution and a complexing agent are allowed to react by the continuous coprecipitation method described in JP-A-2002-201028 to produce a metal composite hydroxide represented by $Ni_{(1-y-z)}Co_yMn_z(OH)_2$ (in the formula, $0 \leq y \leq 0.4$, $0 \leq z \leq 0.4$, and $y+z<1$).

Although there is no particular limitation with respect to a nickel salt as a solute in the above nickel salt solution, for example, any one or more of nickel sulfate, nickel nitrate, nickel chloride and nickel acetate can be used.

As a cobalt salt as a solute in the above cobalt salt solution, for example, any one or more of cobalt sulfate, cobalt nitrate, cobalt chloride and cobalt acetate can be used.

As a manganese salt as a solute in the above manganese salt solution, for example, any one or more of manganese sulfate, manganese nitrate, manganese chloride and manganese acetate can be used.

These metal salts are used in a ratio corresponding to the composition ratio of the aforementioned $Ni_{(1-y-z)}Co_yMn_z(OH)_2$. That is, the amount of each metal salt is specified so that the molar ratios of nickel, cobalt and manganese in the mixture solution correspond to (1-y-z):y:z in the above composition formula, respectively. Further, as a solvent, water can be used.

The complexing agent is a compound capable of forming a complex with nickel ions, cobalt ions and manganese ions in an aqueous solution, and examples of the complexing agent include an ammonium ion donor (such as ammonium sulfate, ammonium chloride, ammonium carbonate and ammonium fluoride), hydrazine, ethylenediaminetetraacetic acid, nitrilotriacetic acid, uracildiacetic acid and glycine.

The complexing agent may not be contained if desired. When the complexing agent is contained, the amount of the complexing agent contained in a mixture solution containing the nickel salt solution, the cobalt salt solution, manganese salt solution and the complexing agent may be, for example, more than 0 and equal to or less than 2.0 in terms of a molar ratio with respect to the total number of moles of the metal salts.

For adjusting the pH value of the aqueous solution during the precipitation, if necessary, an alkali metal aqueous solution (for example, sodium hydroxide and potassium hydroxide) is added.

When the complexing agent is successively supplied to the reaction vessel in addition to the above nickel salt solution, cobalt salt solution and manganese salt solution, nickel, cobalt, and manganese react with each other to produce a metal composite hydroxide. The reaction is performed with the temperature in the reaction vessel being regulated, for example, within the range of 20° C. to 80° C. preferably 30° C. to 70° C. and the pH value in the reaction vessel being regulated, for example, within the range of 9 to 13, preferably 11 to 13 at measurement temperature of 40° C., while appropriately agitating the content of the reaction vessel. With respect to the reaction vessel, a reaction vessel which allows the overflow for separation of the precipitated reaction product can be used.

The inside of the reaction vessel may be in an inert atmosphere. The inert atmosphere suppresses the aggregation of elements that are more easily oxidized than nickel, and a uniform metal composite hydroxide can be obtained.

Further, the inside of the reaction vessel may be in an appropriate oxygen-containing atmosphere or in the presence of an oxidizing agent while maintaining an inert atmosphere. This is because the morphology of the metal composite hydroxide can be easily controlled by appropriately oxidizing the transition metal. The oxygen and oxidant in the oxygen-containing gas need only have sufficient oxygen atoms to oxidize the transition metal. If a large amount of oxygen atoms are not introduced, the inert atmosphere in the reaction vessel can be maintained. When controlling the atmosphere in the reaction vessel with a gas type, a predetermined gas type may be aerated in the reaction vessel or bubbling directly with the reaction solution.

After the above reaction, the obtained reaction precipitate is washed and then dried to isolate a nickel-containing metal composite hydroxide as a nickel-containing MCC.

For the isolation, a method of dehydrating a slurry (coprecipitate slurry) containing a reaction precipitate by centrifugation, suction filtration, or the like is preferably used.

The coprecipitate obtained by the dehydration is preferably washed with water or a washing liquid containing alkali. In the present embodiment, it is preferable to wash with a washing liquid containing alkali, and more preferably to wash with a sodium hydroxide solution. Further, washing may be performed using a washing liquid containing a sulfur element. Examples of the washing liquid containing a sulfur element include an aqueous sulfate solution of potassium or sodium.

In the above example, a nickel-containing metal composite hydroxide is produced; however, a nickel-containing metal composite oxide may be produced instead. When preparing a nickel-containing metal composite oxide, a method of heat-treating the nickel-containing metal composite hydroxide can be used.

The reaction conditions such as amount ratio of the metal salt supplied to the reaction vessel, the amount of the complexing agent added, the stirring speed, the reaction temperature, the reaction pH, the amount of the oxygen-containing gas introduced, the amount of the oxidizing agent added, and the calcination conditions described later can be optimized while monitoring the various physical properties of the final LiMO to be obtained since the optimal reaction conditions may vary depending on the size of the reaction vessel used, etc.

The tamped density (TD) of the nickel-containing MCC produced by this step is preferably 2.0 g/cc or more and 5.0 g/cc or less, more preferably 2.1 g/cc or more and 4.9 g/cc or less, and still more preferably 2.2 g/cc or more and 4.8 g/cc or less.

By using a nickel-containing MCC having a tamped density (TD) of the above lower limit value or more, the LiMO satisfying the requirements (1) and (3) can be produced.

By using a nickel-containing MCC having a tamped density (TD) of the above upper limit value or less, the reactivity of each particle becomes high during calcination, and it is possible to produce the LiMO containing many primary particles that are present independently of the secondary particles and having a large average primary particle diameter. In the context of the present specification, the tamped density corresponds to the tap bulk density in JIS R 1628-1997.

The $D_{50}$ of the nickel-containing MCC produced by this step is preferably 8 μm or more, more preferably 10 μm or more, and still more preferably 12 μm or more.

Examples of the upper limit value of $D_{50}$ of the nickel-containing MCC include 20 μm, 18 μm, and 16 μm.

The upper limit values and lower limit values can be arbitrarily combined.

As an example of the combination, the $D_{50}$ may be, 8 μm or more and 20 μm or less, 10 μm or more and 18 μm or less, or 12 μm or more and 16 μm or less.

By using a nickel-containing MCC having a $D_{50}$ of the above lower limit value or more, the LiMO satisfying the requirements (1) and (3) can be produced.

Further, by using a nickel-containing MCC having a $D_{50}$ of the above upper limit value or less, the reactivity at the calcination step is enhanced, and the average primary particle diameter of the LiMO can be controlled within a preferably range of the present embodiment.

Further, the $D_{10}$ of the nickel-containing MCC produced by this step is preferably 3 μm or more, more preferably 4 μm or more, and still more preferably 5 μm or more.

Further, the $D_{10}$ of the nickel-containing MCC is preferably 10 μm or less, more preferably 9 μm, and still more preferably 8 μm or less.

The upper limit values and lower limit values can be arbitrarily combined.

As an example of the combination, the 10% cumulative volume particle size $D_{10}$ is preferably 3 μm or more and 10 μm or less, more preferably 4 μm or more and 9 μm or less, and still more preferably 5 μm or more and 8 μm or less.

By using a nickel-containing MCC having a $D_{10}$ within the above range, the LiMO satisfying the requirement (3) can be produced.

$D_{10}$ and $D_{50}$ of the nickel-containing MCC can be measured by the same method as the method for measuring $D_{10}$ and $D_{50}$ of the LiMO.

The $D_{10}$ of the nickel-containing MCC can be increased to a desired size by sufficient stirring in the reaction vessel. It is preferably to set the shape and rotation speed of the stirring blade according to the size of the reaction vessel and provide a mechanism for controlling the flow of liquid such as a baffle in order to sufficiently stir in the reaction vessel. Sufficient stirring in the reaction vessel can be confirmed by collecting coprecipitate slurries at a plurality of locations in the reaction vessel and confirming that the particle size distributions are the same.

For example, it is possible to obtain the nickel-containing MCC having predetermined tamped density, $D_{50}$, and $D_{10}$ by adjusting the amount ratio of the metal salt supplied to the reaction vessel, the amount of the complexing agent added, the reaction temperature, the reaction pH and the amount of the oxidizing agent added in the production step of nickel-containing MCC by the coprecipitation method. For examples, when the amount of the complexing agent added is reduced and the concentration of the complexing agent in the reaction vessel is reduced, the nickel-containing MCC having small tamped density, small $D_{50}$, and small $D_{10}$ can be obtained. In other words, when the amount of the complexing agent added is increased and the concentration of the complexing agent in the reaction vessel is increased, the nickel-containing MCC having large tamped density, large $D_{50}$, and large $D_{10}$ can be obtained. When a solution containing the complexing agent is used, the amount of the complexing agent added can be adjusted by changing the amount of the solution added or by changing the concentration of the complexing agent in the solution. Further, when the complexing agent is used alone, the amount of the complexing agent added can be adjusted by changing the amount of the complexing agent added.

For example, the reaction pH value is preferably 11 or more and 13 or less. When the complexing agent is an ammonium ion donor, the ammonia concentration in the reaction vessel is preferably 0.18 mol/L or more and 0.30 mol/L or less. The ammonia concentration in the reaction vessel can be measured with an ammonia densitometer.

[Mixing Step]

This step is a step for mixing a lithium compound and a precursor to obtain a mixture.

Lithium Compound

As the lithium compound used in the present embodiment, a mixture of any one of lithium carbonate, lithium nitrate, lithium acetate, lithium hydroxide, lithium oxide, lithium chloride and lithium fluoride, or mixture thereof can be used. Among these, either one or both of lithium hydroxide and lithium carbonate is preferable.

Further, when the lithium compound contains lithium carbonate, the content of lithium carbonate in the lithium compound is preferably 5% by mass or less.

A method for mixing the above precursor and the above lithium compound will be described.

The precursor is dried, and then mixed with the lithium compound. The drying conditions are not particularly limited, and examples thereof include any of the following drying conditions 1) to 3).

1) A condition in which the precursor is not oxidized or reduced.

More specifically, it is a drying condition in which an oxide is maintained as an oxide, or a drying condition in which a hydroxide is maintained as a hydroxide.

2) A condition in which the precursor is oxidized.

More specifically, it is a drying condition for oxidation from a hydroxide to an oxide.

3) A condition in which the precursor is reduced.

More specifically, it is a drying condition for reduction from an oxide to a hydroxide.

The drying conditions 1) to 3) may be appropriately selected depending on whether the nickel-containing MCC to be produced is either a nickel-containing metal composite hydroxide or a nickel-containing metal composite oxide.

As a condition in which the precursor is not oxidized or reduced, it may be dried using an inert gas such as nitrogen, helium and argon. In a condition in which the metal composite hydroxide as a precursor is oxidized, oxygen or air may be used.

Further, as a condition in which the precursor is reduced, it may be dried using a reducing agent such as hydrazine or sodium sulfite in an inert gas atmosphere.

After drying the precursor, classification may be performed as appropriate.

The aforementioned lithium compound and the precursor are mixed in respective amounts determined in view of the composition ratio of the end product. For example, when a nickel-containing metal composite hydroxide is used as the precursor, the lithium compound and the metal composite hydroxide are mixed at a ratio corresponding to the composition ratio of the composition formula (I). Specifically, the lithium salt is mixed such that the ratio of the number of lithium atoms with respect to the total number of metal atoms contained in the precursor is more than 1.0. The ratio of the number of lithium atoms with respect to the number of metal atoms is preferably 1.05 or more, and more preferably 1.10 or more. The lithium composite oxide can be obtained by calcining a mixture of the nickel-containing metal composite hydroxide and the lithium compound in a subsequent calcination step.

[Step of Calcining Mixture to Obtain LiMO]

In the present embodiment, a mixture of the above lithium compound and the precursor is preferably calcined in the presence of an inert melting agent. By applying the production method (flux method) using an inert melting agent, LiMO satisfying the requirement (1) can be produced.

Calcination of the mixture in the presence of an inert melting agent can facilitate the reaction of the mixture. The inert melting agent may remain in the LiMO after calcination, or it may be removed by washing the mixture with washing liquid after calcination. In the present embodiment, it is preferable to wash the LiMO after calcination with pure water, an alkaline washing liquid, or the like.

The primary particle diameter of the obtained LiMO can be controlled within a preferably range of the present embodiment by adjusting the calcination temperature.

Normally, the higher the calcination temperature, the larger the primary particle diameter and the smaller the BET specific surface area tend to be. The calcination temperature may be appropriately adjusted depending on the type of transition metal element to be used and the types and amounts of precipitant and inert melting agent.

The average primary particle diameter of the obtained LiMO can be controlled within a preferably range of the present embodiment by adjusting the calcination temperature, using a precursor having a high density and a large particle diameter, or a combination thereof.

In the present embodiment, the setting of the calcination temperature can be done in consideration of the melting point of the inert melting agent described below, and the calcination temperature is preferably set within a range of ±200° C. from the melting point of the inert melting agent.

Specifically, the calcination temperature may be within a range of 200° C. to 1150° C., and is preferably within a range of 300° C. to 1050° C., and more preferably 500° C. to 1000° C.

The calcination temperature in the present specification refers to a set temperature of the calcination furnace.

The primary particle diameter of the obtained LiMO can be controlled with a preferably range of the present embodiment by adjusting the holding time in calcination. The longer the holding time, the larger the primary particle diameter and the smaller the BET specific surface area tends to be. The holding time during calcination may be appropriately adjusted depending on the type of transition metal element to be used and the types and amounts of precipitant and inert melting agent.

Specifically, the time for holding the above calcination temperature may be 0.1 hour or more and 20 hours or less, and is preferably 0.5 hours or more and 10 hours or less. The rate of temperature increase to the above calcination temperature is usually 50° C./hour or more and 400° C./hour or less, and the rate of temperature decrease from the above calcination temperature to room temperature is usually 10° C./hour or more and 400° C./hour or less. Further, as the atmosphere for calcination, air, oxygen, nitrogen, argon or a mixed gas thereof can be used.

The inert melting agent that can be used in the present embodiment is not particularly limited as long as it is unlikely to react with the mixture during calcination. In the present embodiment, examples thereof include at least one selected from the group consisting of a fluoride of one or more elements selected from the group consisting of Na, K, Rb, Cs, Ca, Mg, Sr and Ba (hereinafter referred to as "A"), a chloride of A, a carbonate of A, a sulfate of A, a nitrate of A, a phosphate of A, a hydroxide of A, a molybdate of A and a tungstate of A.

Examples of the fluoride of A include NaF (melting point: 993° C.), KF (melting point: 858° C.), RbF (melting point: 795° C.), CsF (melting point: 682° C.), $CaF_2$ (melting point: 1,402° C.), $MgF_2$ (melting point: 1,263° C.), $SrF_2$ (melting point: 1,473° C.) and $BaF_2$ (melting point: 1,355° C.).

Examples of the chloride of A include NaCl (melting point: 801° C.), KCl (melting point: 770° C.), RbCl (melting point: 718° C.), CsCl (melting point: 645° C.), $CaCl_2$ (melting point: 782° C.), $MgCl_2$ (melting point: 714° C.), $SrCl_2$ (melting point: 857° C.) and $BaCl_2$ (melting point: 963° C.).

Examples of the carbonate of A include $Na_2CO_3$ (melting point: 854° C.), $K_2CO_3$ (melting point: 899° C.), $Rb_2CO_3$ (melting point: 837° C.), $Cs_2CO_3$ (melting point: 793° C.), $CaCO_3$ (melting point: 825° C.), $MgCO_3$ (melting point: 990° C.), $SrCO_3$ (melting point: 1,497° C.) and $BaCO_3$ (melting point: 1,380° C.).

Examples of the sulfate of A include $Na_2SO_4$ (melting point: 884° C.), $K_2SO_4$ (melting point: 1,069° C.), $Rb_2SO_4$ (melting point: 1,066° C.), $Cs_2SO_4$ (melting point: 1.005° C.), $CaSO_4$ (melting point: 1,460° C.), $MgSO_4$ (melting point: 1,137° C.), $SrSO_4$ (melting point: 1,605° C.) and $BaSO_4$ (melting point: 1,580° C.).

Examples of the nitrate of A include $NaNO_3$ (melting point: 310° C.), $KNO_3$ (melting point: 337° C.), $RbNO_3$ (melting point: 316° C.), $CsNO_3$ (melting point: 417° C.). $Ca(NO_3)_2$ (melting point: 561° C.), $Mg(NO_3)_2$, $Sr(NO_3)_2$ (melting point: 645° C.) and $Ba(NO_3)_2$ (melting point: 596° C.).

Examples of the phosphate of A include $Na_3PO_4$, $K_3PO_4$ (melting point: 1.340° C.), $Rb_3PO_4$, $Cs_3PO_4$, $Ca_3(PO_4)_2$, $Mg3(PO_4)_2$ (melting point: 1,184° C.), $Sr_3(PO_4)_2$ (melting point: 1,727° C.) and $Ba_3(PO_4)_2$ (meting point: 1,767° C.).

Examples of the hydroxide of A include NaOH (melting point: 318° C.), KOH (melting point: 360° C.). RbOH (melting point: 301° C.), CsOH (melting point: 272° C.). $Ca(OH)_2$ (melting point: 408° C.), $Mg(OH)_2$ (melting point: 350° C.). $Sr(OH)_2$ (melting point: 375° C.) and $Ba(OH)_2$ (melting point: 853° C.).

Examples of the molybdate of A include $Na_2MoO_4$ (melting point: 698° C.), $K_2MoO_4$ (melting point: 919° C.), $Rb_2MoO_4$ (melting point: 958° C.), $Cs_2MoO_4$ (melting point: 956° C.), $CaMoO_4$ (melting point: 1,520° C.), $MgMoO_4$ (melting point: 1,060° C.), $SrMoO_4$ (melting point: 1,040° C.) and $BaMoO_4$ (melting point: 1,460° C.).

Examples of the tungstate of A include $Na_2WO_4$ (melting point: 687° C.), $K_2WO_4$, $Rb_2WO_4$, $Cs_2WO_4$, $CaWO_4$, $MgWO_4$, $SrWO_4$ and $BaWO_4$.

In the present embodiment, it is also possible to use two or more of these inert melting agents. When two or more inert melting agents are used, the melting point may be lowered. Further, among these inert melting agents, the inert melting agent for obtaining LiMO having higher crystallinity is preferably any one or combination of a hydroxide, carbonate, sulfate and chloride of A. Moreover, A is preferably either one or both of sodium (Na) and potassium (K). That is, among the above, the inert melting agent is particularly preferably at least one selected from the group consisting of NaOH, KOH, NaCl, KCl, $Na_2CO_3$, $K_2CO_3$, $Na_2SO_4$ and $K_2SO_4$.

In the present embodiment, the inert melting agent is preferably $K_2SO_4$.

In the present embodiment, the amount of the inert melting agent used during the calcination may be appropriately set. As for the amount of the inert melting agent used during the calcination, the ratio of the number of moles of the inert melting agent with respect to the total number of moles of the lithium compound and the inert melting agent is preferably 0.010 or more and 30 or less, more preferably 0.015 or more and 20 or less, and still more preferably 0.020 or more and 15 or less.

In the present embodiment, the requirement (2) can be easily controlled within the range of the present embodiment by crushing the LiMO after calcination for an appropriate time.

The "appropriate time" refers to a time that disperses agglomeration without causing cracks in the primary particles of LiMO. The crushing time is preferably adjusted depending on the aggregation state of LiMO. The crushing time is particularly preferably in the range of, for example, 10 minutes or more and 2 hours or less.

Pure water or an alkaline washing liquid can be used for washing the inert melting agent remaining in the LiMO after crushing.

Examples of the alkaline washing liquid include an aqueous solution of one or more anhydrides or hydrates selected from the group consisting of LiOH (lithium hydroxide), NaOH (sodium hydroxide), KOH (potassium hydroxide), $Li_2CO_3$ (lithium carbonate), $Na_2CO_3$ (sodium carbonate), $K_2CO_3$ (potassium carbonate), and $(NH_4)_2CO_3$ (ammonium carbonate). Further, ammonia can also be used as an alkali.

The temperature of the washing liquid used for washing is preferably 15° C. or less, more preferably 10° C. or less, and still more preferably 8° C. or less. By controlling the temperature of the washing liquid within the above range which prevents the washing liquid from freezing, lithium ions can be prevented from excessively leaching from the crystal structure of the LiMO into the washing liquid during washing.

In the washing step, examples of the method of bringing the washing liquid into contact with the LiMO include a method of adding the LiMO into each aqueous washing liquid and stirring the resulting, a method of showering an aqueous washing liquid on the LiMO, and a method of adding the LiMO into the aqueous washing liquid, stirring the resulting, then separating the LiMO from the aqueous washing liquid, and then showering an aqueous washing liquid on the separated LiMO.

In the washing step, it is possible to obtain a metal composite hydroxide whose requirement (2) van be easily controlled within the range of the present embodiment by contacting the washing liquid and the LiMO for an appropriate time range.

The "appropriate time" refers to a time that disperses each particle of the LiMO while removing the inert melting agent remaining on the surface of the LIMO. The washing time is preferably adjusted depending on the aggregation state of the LiMO. The washing time is particularly preferably in the range of, for example, 5 minutes or more and 1 hour or less.

[Drying Step]

In the present embodiment, it is preferably to further have a drying step after the washing step. The temperature and method for drying the LiMO in the drying step are not particularly limited, and the drying temperature is preferably 30° C. or higher, more preferably 40° C. or higher, and still more preferably 50° C. or higher, from the viewpoint of sufficiently removing water. Further, from the viewpoint of preventing the formation of a heterogeneous phase on the surface, the drying temperature is preferably less than 300° C., more preferably 250° C. or less, and still more preferably 200° C. or less.

The atmosphere of the drying step includes an oxygen atmosphere, an inert atmosphere, a reduced pressure atmosphere, and a vacuum atmosphere. By performing the drying step after washing in the above atmosphere, the reaction between LiMO, and the moisture and carbon dioxide in the atmosphere is suppressed during the drying step, and LiMO with less impurities can be obtained.

[Re-Calcination Step]

In the present embodiment, Re-calcination step may be included after the washing step.

The calcination temperature in the re-calcination step of the LIMO is not particularly limited, and is preferably 300° C. or higher, more preferably 350° C. or higher, and still more preferably 400° C. or higher, from the viewpoint of preventing a decrease in charge capacity. Further, the calcination temperature in the re-calcination step of the LiMO is not particularly limited, and is preferably 1000° C. or less, and more preferably 950° C. or less, from the viewpoint of preventing the volatilization of the lithium and obtaining the LiMO having the target composition.

Lithium volatilization can be controlled by the calcination temperature.

The upper limit values and lower limit values of the calcination temperature can be arbitrarily combined.

As the re-calcination time, the total time from the start of temperature increase to the end of temperature holding is preferably 1 hour or more and 30 hours or less. When the total time is 30 hours or less, the volatilization of lithium can be prevented and deterioration of battery performance can be prevented.

When the total time is 1 hour or more, the crystal development excellently progresses and the battery performance can be improved.

Further, impurities can be reduced by performing the re-calcination step under the above conditions.

<CAM>

The present embodiment describes a CAM containing the LiMO of the present invention. The content ratio of LiMO with respect to the total mass (100% by mass) of CAM is preferably 70% by mass or more and 99% by mass or less, and more preferably 80% by mass or more and 98% by mass or less.

<Lithium Secondary Battery>

Next, a configuration of a suitable lithium secondary battery when the LiMO of the present embodiment is used as a CAM will be described.

Further, a suitable positive electrode for a lithium secondary battery (hereinafter, may be referred to as a positive electrode) when the LiMO of the present embodiment is used as a CAM will be described.

Furthermore, a lithium secondary battery as a suitable use of a positive electrode will be described.

In an example, the lithium secondary battery includes a positive electrode and a negative electrode, a separator sandwiched between the positive electrode and the negative electrode, and an electrolytic solution disposed between the positive electrode and the negative electrode.

Figure 1B:
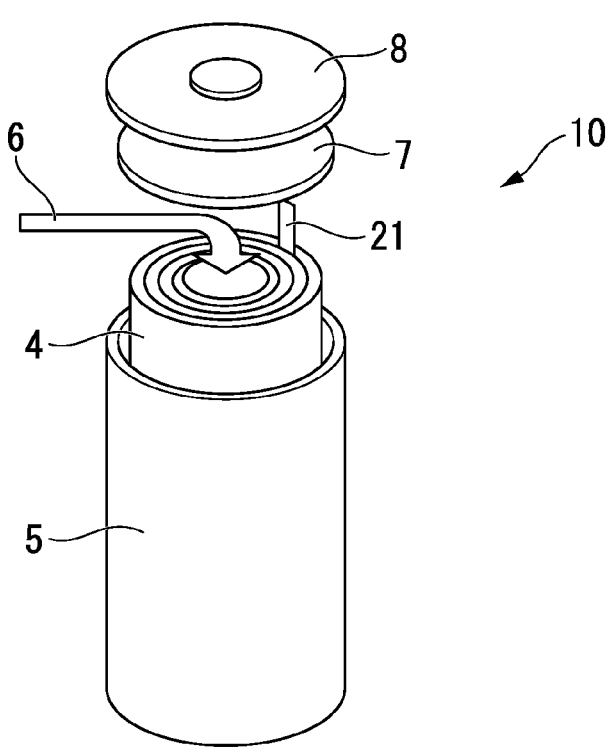
FIG. 1B is a schematic configuration diagram showing an example of a lithium ion secondary battery.

Each of FIG. 1A and FIG. 1B is a schematic view showing an example of a lithium secondary battery. A cylindrical lithium secondary battery 10 of the present embodiment is produced as follows.

First, as shown in FIG. 1A, a pair of separators 1 having a strip shape, a strip-shaped positive electrode 2 having a positive electrode lead 21 at one end, and a strip-shaped negative electrode 3 having an negative electrode lead 31 at one end are laminated in an order of the separator 1, the positive electrode 2, the separator 1, and the negative electrode 3, and are wound into an electrode group 4.

Next, as shown in FIG. 1B, after accommodating the electrode group 4 and an insulator (not shown) in a battery can 5, the bottom of the can is sealed, and then the electrode group 4 is impregnated with an electrolytic solution 6 such that an electrolyte is disposed between the positive electrode 2 and the negative electrode 3. Furthermore, by sealing an upper portion of the battery can 5 with a top insulator 7 and a sealing body 8, the lithium secondary battery 10 can be produced.

Examples of the shape of the electrode group 4 include a columnar shape so that the cross-sectional shape when the electrode group 4 is cut in the direction perpendicular to the winding axis is a circle, an ellipse, a rectangle, or a rectangle with rounded corners.

Further, as the shape of the lithium secondary battery having such an electrode group 4, the shape prescribed by IEC60086, which is a standard for batteries prescribed by the International Electrotechnical Commission (IEC), or by JIS C8500 can be adopted. Examples thereof include a cylindrical shape, an angular shape and the like.

Furthermore, the lithium secondary battery is not limited to the winding type configuration as described above, and may have a laminated type configuration in which a laminated structure of a positive electrode, a separator, a negative electrode and a separator is repeatedly overlaid. Examples of the laminated lithium secondary battery include the so-called coin-type batteries, button-type batteries and paper-type (or sheet-type) batteries.

Hereinafter, each configuration will be described in order.

(Positive Electrode)

The positive electrode can be produced by first preparing a positive electrode mix containing a CAM, a conductive material and a binder, and then causing the positive electrode mix to be supported on a positive electrode current collector.

(Conductive Material)

A carbon material can be used as the conductive material included in the positive electrode. Examples of the carbon material include a graphite powder, carbon black (for example, acetylene black), and a fibrous carbon material. Since carbon black is fine particles and has a large surface area, the addition of a small amount of carbon black to the positive electrode mix enhances the conductivity inside the positive electrode and improves the charge and discharge efficiency and output characteristics. However, when the carbon black is added too much, both the binding strength between the positive electrode mix and the positive electrode current collector and the binding strength inside the positive electrode mix by the binder decrease, which conversely causes an increase in internal resistance.

The ratio of the conductive material in the positive electrode mix is preferably 5 parts by mass or more and 20 parts by mass or less with respect to 100 parts by mass of CAM. In the case of using a fibrous carbon material such as a graphitized carbon fiber or a carbon nanotube as the conductive material, it is also possible to decrease this ratio.

(Binder)

A thermoplastic resin can be used as the binder included in the positive electrode of the present embodiment. Examples of the thermoplastic resin include polyimide resins; fluororesins such as polyvinylidene fluoride (hereinafter, may be referred to as PVdF) and polytetrafluoroethylene; polyolefin resins such as polyethylene and polypropylene, and resins described in WO2019/098384A1 or US2020/0274158A1.

Two or more of these thermoplastic resins may be used in the form of a mixture thereof. When a fluororesin and a polyolefin resin are used as binders, the ratio of the fluororesin with respect to the entire positive electrode mix is set to 1% by mass or more and 10% by mass or less and the ratio of the polyolefin resin with respect to the entire positive electrode mix is set to 0.1% by mass or more and 2% by mass, it is possible to obtain a positive electrode mix having both a high adhesive force relative to the positive electrode current collector and a high bonding force inside the positive electrode mix.

(Positive Electrode Current Collector)

As the positive electrode current collector included in the positive electrode, it is possible to use a strip-shaped member composed of a metal material such as Al, Ni, or stainless steel as a forming material. It is particularly preferred to use a current collector which is formed of Al and is shaped into a thin film because of its high processability and low cost.

Examples of the method for causing the positive electrode mix to be supported on the positive electrode current collector include a method in which the positive electrode mix is pressure molded on the positive electrode current collector. Alternatively, the positive electrode mix may be caused to be supported on the positive electrode current collector by producing a paste from the positive electrode mix using an organic solvent, and applying the obtained paste of the positive electrode mix to at least one surface side of the positive electrode current collector, followed by drying and pressing the resultant for fixation.

Examples of the organic solvent that can be used in the case of producing the paste from the positive electrode mix include an amine-based solvent such as N,N-dimethylaminopropylamine and diethylenetriamine; an ether-based solvent such as tetrahydrofuran; a ketone-based solvent such as methyl ethyl ketone; an ester-based solvent such as methyl acetate; and an amide-based solvent such as dimethylacetamide and N-methyl-2-pyrrolidone (hereinafter, referred to as NMP in some cases).

Examples of the method for applying the paste of the positive electrode mix to the positive electrode current collector include a slit die coating method, a screen coating method, a curtain coating method, a knife coating method, a gravure coating method and an electrostatic spray method.

The positive electrode can be produced by the method as described above.

(Negative Electrode)

The negative electrode included in the lithium secondary battery is not particularly limited as long as it is capable of doping and de-doping lithium ions at a potential lower than that of the positive electrode, and examples thereof include an electrode in which a negative electrode mix containing a negative electrode active material is supported on a negative electrode current collector, and an electrode composed solely of a negative electrode active material.

(Negative Electrode Active Material)

Examples of the negative electrode active material included in the negative electrode include materials which are carbon materials, chalcogen compounds (oxides, sulfides or the like), nitrides, metals or alloys, and allow lithium ions to be doped or de-doped at a potential lower than that of the positive electrode.

Examples of the carbon material that can be used as the negative electrode active material include graphite such as natural graphite or artificial graphite, cokes, carbon black, pyrolytic carbons, carbon fibers, and calcined products of organic polymer compounds.

Examples of the oxide that can be used as the negative electrode active material include oxides of silicon represented by a formula: $SiO_x$ (here, x is a positive real number) such as $SiO_2$ and $SiO$; oxides of tin represented by a formula: $SnO_x$ (here, x is a positive real number) such as $SnO_2$ and $SnO$; and metal composite oxides containing lithium and titanium such as $Li_4Ti_5O_{12}$.

Further, examples of the metal that can be used as the negative electrode active material include lithium metal, silicon metal, tin metal, and the like.

As a material that can be used as the negative electrode active material, materials described in WO2019/098384A1 or US2020/0274158A1 may be used.

These metals and alloys are mainly used alone as an electrode after being processed into, for example, a foil.

Among the above negative electrode active materials, carbon materials containing graphite such as natural graphite and artificial graphite as a main component are preferably used for reasons that: the potential of the negative electrode hardly changes during charging from an uncharged state to a fully charged state (the potential flatness is favorable); the average discharge potential is low; the capacity retention rate at the time of repeated charge and discharge is high (the cycle characteristics are favorable); and the like. The shape of the carbon material may be, for example, any of a flake shape as in the case of natural graphite, a spherical shape as in the case of mesocarbon microbeads, a fibrous shape as in the case of a graphitized carbon fiber, or an aggregate of fine powder.

The above negative electrode mix may contain a binder, if necessary. As the binder, a thermoplastic resin can be used, and specific examples thereof include PVdF, thermoplastic polyimides, carboxymethyl cellulose (hereinafter, may be referred to as CMC), styrene-butadiene rubbers (hereinafter, may be referred to as SBR), polyethylene and polypropylene.

(Negative Electrode Current Collector)

Examples of the negative electrode current collector included in the negative electrode include a strip-shaped member composed of a metal material such as Cu, Ni and stainless steel as a forming material. In particular, a negative electrode current collector that uses Cu as a forming material and processed into a thin film shape is preferable since Cu is unlikely to form an alloy with lithium and can be easily processed.

Examples of the method for causing the negative electrode mix to be supported on such a negative electrode current collector include, as in the case of the positive electrode, a method by pressure molding, and a method in which a paste of the negative electrode mix obtained by using a solvent or the like is applied to and dried on the negative electrode current collector, followed by pressure bonding.

(Separator)

As the separator included in the lithium secondary battery, it is possible to use, for example, a material that is composed of a material such as a polyolefin resin (such as polyethylene and polypropylene), a fluororesin or a nitrogen-containing aromatic polymer and has a form of a porous film, a nonwoven fabric, a woven fabric or the like. Further, the separator may be formed by using two or more of these materials or the separator may be formed by laminating these materials. Moreover, separators described in JP-A-2000-030686 and US20090111025A1 may be used.

In the present embodiment, for satisfactory permeation of the electrolyte during the use (at the time of charging and discharging) of the battery, the separator preferably has an air resistance of 50 sec/100 cc or more and 300 sec/100 cc or less, and more preferably 50 sec/100 cc or more and 200 sec/100 cc or less, as measured by the Gurley method prescribed in JIS P 8117.

Further, the porosity of the separator is preferably 30% by volume or more and 80% by volume or less, and more preferably 40% by volume or more and 70% by volume or less with respect to the total volume of the separator. The separator may be a laminate of separators having different porosities.

(Electrolytic Solution)

The electrolytic solution included in the lithium secondary battery contains an electrolyte and an organic solvent.

Examples of the electrolyte contained in the electrolytic solution include lithium salts such as $LiClO_4$ and $LiPF_6$, and a mixture of two or more of these salts may be used. Further, electrolytes described in WO2019/098384A1 or US2020/0274158A1 may be used. Among these, as the electrolyte, it is preferable to use at least one fluorine-containing salt selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$.

Further, as the organic solvent contained in the above electrolytic solution, for example, propylene carbonate, ethylene carbonate, dimethyl carbonate, diethyl carbonate, ethyl methyl carbonate, and organic solvents described in WO2019/098384A1 or US2020/0274158A1 can be used.

As the organic solvent, it is preferable to use a mixture of two or more of these organic solvents. Among these, a mixed solvent containing a carbonate is preferable, and a mixed solvent of a cyclic carbonate and a non-cyclic carbonate and a mixed solvent of a cyclic carbonate and an ether are more preferable. As the mixed solvent of a cyclic carbonate and a non-cyclic carbonate, a mixed solvent containing ethylene carbonate, dimethyl carbonate, and ethyl methyl carbonate is preferable. An electrolytic solution using such a mixed solvent has a number of features as follows: the electrolytic solution has a broad operating temperature range, does not easily deteriorate even when charged and discharged at a high current rate, does not easily deteriorate even when used for a long period of time, and does not easily decompose even in a case where a graphite material such as natural graphite or artificial graphite is used as an active material for the negative electrode.

Further, as the electrolytic solution, it is preferable to use an electrolytic solution containing a lithium salt containing fluorine such as $LiPF_6$ and an organic solvent having a fluorine substituent because the safety of the obtained lithium secondary battery is enhanced. A mixed solvent containing an ether having a fluorine substituent such as pentafluoropropyl methyl ether and 2,2,3,3-tetrafluoropropyl difluoromethyl ether and dimethyl carbonate is still more preferable since the capacity retention rate is high even when charged and discharged at a high current rate.

<All-Solid-State Lithium Secondary Battery>

Next, a positive electrode using LiMO according to one aspect of the present invention as a positive electrode active material of an all-solid-state lithium secondary battery, and an all-solid-state lithium secondary battery having this positive electrode will be described while explaining the configuration of the all-solid-state lithium secondary battery.

Figure 2:
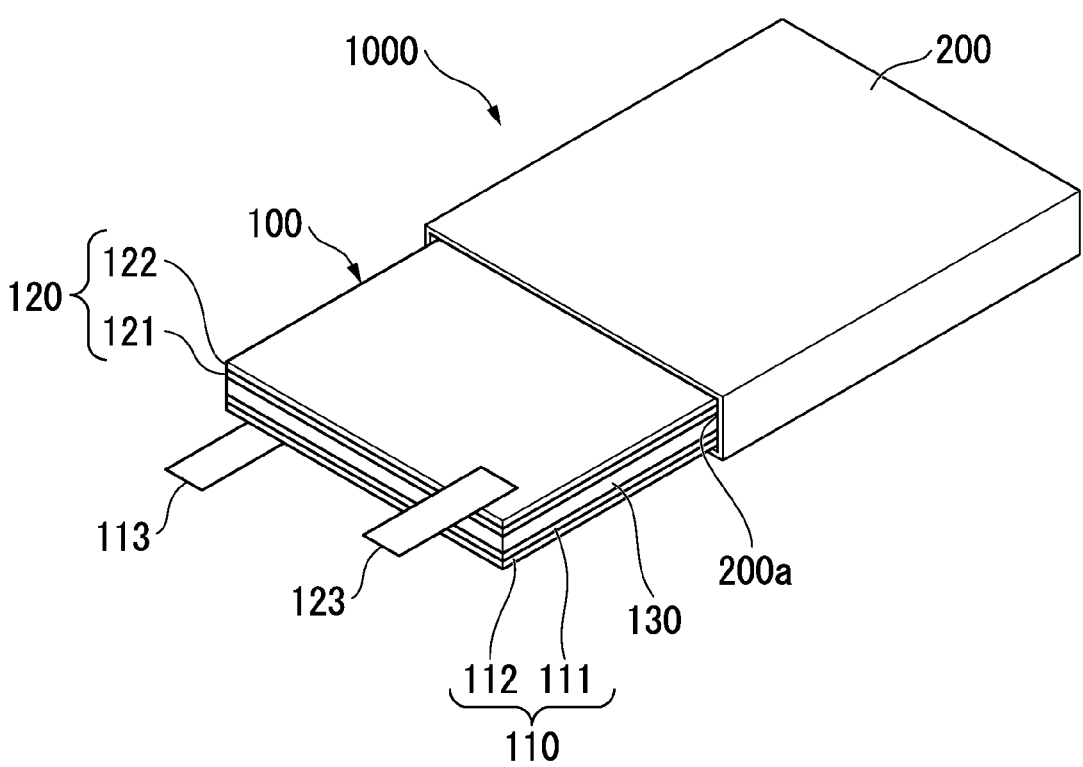
FIG. 2 is a schematic diagram showing an example of an all-solid-state lithium secondary battery.

FIG. 2 is a schematic diagram showing an example of an all-solid-state lithium secondary battery of the present embodiment. An all-solid-state secondary battery 1,000 shown in FIG. 2 includes a laminate 100 having a positive electrode 110, a negative electrode 120 and a solid electrolyte layer 130, and an exterior body 200 accommodating the laminate 100. Further, the all-solid-state lithium secondary battery 1,000 may have a bipolar structure in which a positive electrode active material and a negative electrode active material are arranged on both sides of a current collector. Specific examples of the bipolar structure include structures described in JP-A-2004-95400. A material constituting each member will be described later.

The laminate 100 may have an external terminal 113 connected to a positive electrode current collector 112 and an external terminal 123 connected to a negative electrode current collector 122. In addition, the all-solid-state lithium secondary battery 1,000 may have a separator between the positive electrode 110 and the negative electrode 120.

The all-solid-state lithium secondary battery 1,000 further has an insulator (not shown) that insulates the laminate 100 and the exterior body 200 from each other, and a sealant (not shown) that seals an opening 200a of the exterior body 200.

As the exterior body 200, a container obtained by molding a metal material having high corrosion resistance such as aluminum, stainless steel or nickel-plated steel can be used. In addition, as the exterior body 200, a container obtained by processing a laminate film having at least one surface subjected to a corrosion resistant treatment into a bag shape can also be used.

Examples of the shape of the all-solid-state lithium secondary battery 1,000 include shapes such as a coin type, a button type, a paper type (or a sheet type), a cylindrical type, a square type, and a laminate type (pouch type).

Although a form of the all-solid-state lithium secondary battery 1,000 having one laminate 100 is illustrated as an example, the present embodiment is not limited thereto. The all-solid-state lithium secondary battery 1,000 may have a configuration in which the laminate 100 serves as a unit cell and a plurality of unit cells (laminates 100) are sealed inside the exterior body 200.

Hereinafter, each configuration will be described in order.

(Positive Electrode)

The positive electrode 110 of the present embodiment has a positive electrode active material layer 111 and a positive electrode current collector 112.

The positive electrode active material layer 111 contains the positive electrode active material according to one aspect of the present invention described above, and a solid electrolyte. Further, the positive electrode active material layer 111 may contain a conductive material and a binder.

(Solid Electrolyte)

As the solid electrolyte contained in the positive electrode active material layer 111 of the present embodiment, a solid electrolyte that is lithium ion-conductive and used in a known all-solid lithium secondary battery can be adopted. Examples of such a solid electrolyte include an inorganic electrolyte and an organic electrolyte. Examples of the inorganic electrolyte include an oxide-based solid electrolyte, a sulfide-based solid electrolyte, and a hydride-based solid electrolyte. Examples of the organic electrolyte include polymer-based solid electrolytes. Examples of each electrolyte include compounds described in WO2020/208872A1, US2016/0233510A1, US2012/0251871A1 and US2018/0159169A1, and examples thereof include the following compounds.

(Oxide-Based Solid Electrolyte)

Examples of the oxide-based solid electrolyte include perovskite-type oxides, NASICON-type oxides, LISICON-type oxides and garnet-type oxides. Specific examples of each oxide include compounds described in WO2020/208872A1, US2016/0233510A1 and US2020/0259213A1.

Examples of the garnet-type oxide include Li—La—Zr-based oxides such as $Li_7La_3Zr_2O_{12}$ (also referred to as LLZ).

The oxide-based solid electrolyte may be a crystalline material or an amorphous material.

(Sulfide-Based Solid Electrolyte)

Examples of the sulfide-based solid electrolyte include $Li_2S$—$P_2S_5$-based compounds, $Li_2S$—$SiS_2$-based compounds, $Li_2S$—$GeS_2$-based compounds, $Li_2S$—$B_2S_3$-based compounds, $LiI$—$Si_2S$—$P_2S_5$-based compounds, $LiI$—$Li_2S$—$P_2O_5$-based compounds, $LiI$-$LisPO_4$—$P_2S_5$-based compounds and $Li_{10}GeP_2S_{12}$.

It should be noted that in the present specification, the expression "-based compound" which refers to a sulfide-based solid electrolyte is used as a general term for solid electrolytes mainly containing a raw material described before the expression "-based compound" such as "$Li_2S$" and "$P_2S_5$". For example, the $Li_2S$—$P_2S_5$-based compounds include solid electrolytes mainly containing $Li_2S$ and $P_2S_5$ and further containing other raw materials. The ratio of $Li_2S$ contained in the $Li_2S$—$P_2S_5$-based compound is, for example, 50 to 90% by mass with respect to the entire $Li_2S$—$P_2S_5$-based compound. The ratio of $P_2S_5$ contained in the $Li_2S$—$P_2S_5$-based compound is, for example, 10 to 50% by mass with respect to the entire $Li_2S$—$P_2S_5$-based compound. Further, the ratio of other raw materials contained in the $Li_2S$—$P_2S_5$-based compound is, for example, 0 to 30% by mass with respect to the entire $Li_2S$—$P_2S_5$-based compound. Moreover, the $Li_2S$—$P_2S_5$-based compounds also include solid electrolytes containing $Li_2S$ and $P_2S_5$ in different mixing ratios.

Examples of the $Li_2S$—$P_2S_5$-based compound include $Li_2S$—$P_2S_5$, $Li_2S$—$P_2S_5$—$LiI$, $Li_2S$—$P_2S_5$—$LiCl$, $Li_2S$—$P_2S_5$—$LiBr$ and $Li_2S$—$P_2S_5$—$LiI$—$LiBr$.

Examples of the $Li_2S$—$SiS_2$-based compound include $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$ and $Li_2S$—$SiS_2$—$P_2S_5$—$LiCl$.

Examples of the $Li_2S$—$GeS_2$-based compound include $Li_2S$—$GeS_2$ and $Li_2S$—$GeS_2$—$P_2S_5$.

The sulfide-based solid electrolyte may be a crystalline material or an amorphous material.

Two or more types of solid electrolytes can be used in combination as long as the effects of the invention are not impaired.

(Conductive Material and Binder)

As a conductive material included in the positive electrode active material layer 111 of the present embodiment, a material described in the above-mentioned section entitled (conductive material) can be used. Further, as for the ratio of the conductive material in the positive electrode mix, the ratio described in the above-mentioned section entitled (conductive material) can be applied in a similar manner. Moreover, as a binder included in the positive electrode, a material described in the above-mentioned section entitled (binder) can be used.

(Positive Electrode Current Collector)

As the positive electrode current collector 112 included in the positive electrode 110 of the present embodiment, a material described in the above-mentioned section entitled (positive electrode current collector) can be used.

Examples of the method for causing the positive electrode active material layer 111 to be supported on the positive electrode current collector 112 include a method in which the positive electrode active material layer 111 is pressure molded on the positive electrode current collector 112. A cold press or a hot press can be used for pressure molding.

Further, the positive electrode active material layer 111 may be caused to be supported on the positive electrode current collector 112 by producing a positive electrode mix from a paste of a mixture of a positive electrode active material, a solid electrolyte, a conductive material and a binder using an organic solvent, and applying the obtained positive electrode mix on at least one surface of the positive electrode current collector 112, followed by drying and pressing the resultant for fixation.

Alternatively, the positive electrode active material layer 111 may be caused to be supported on the positive electrode current collector 112 by producing a positive electrode mix from a paste of a mixture of a positive electrode active material, a solid electrolyte and a conductive material using an organic solvent, and applying the obtained positive electrode mix on at least one surface of the positive electrode current collector 112, followed by drying and sintering.

As the organic solvent that can be used for the positive electrode mix, the same organic solvent that can be used when the positive electrode mix described above in the section entitled (positive electrode current collector) is formed into a paste can be used.

Examples of the method for applying the positive electrode mix on the positive electrode current collector 112 include the method described in the above-mentioned section entitled (positive electrode current collector).

The positive electrode 110 can be produced by the method as described above.

(Negative Electrode)

The negative electrode 120 has a negative electrode active material layer 121 and a negative electrode current collector 122. The negative electrode active material layer 121 contains a negative electrode active material. Further, the negative electrode active material layer 121 may contain a solid electrolyte and a conductive material. As the negative electrode active material, the negative electrode current collector, the solid electrolyte, the conductive material and the binder, those described above can be used.

Examples of the method for causing the negative electrode active material layer 121 to be supported on the negative electrode current collector 122 include, as in the case of the positive electrode 110, a method by pressure molding, a method in which a negative electrode mix in the form of a paste containing a negative electrode active material is applied to and dried on the negative electrode current collector 122, followed by pressure bonding, and a method in which a negative electrode mix in the form of a paste containing a negative electrode active material is applied to and dried on the negative electrode current collector 122, followed by sintering.

(Solid Electrolyte Layer)

A solid electrolyte layer 130 includes the above-mentioned solid electrolyte.

The solid electrolyte layer 130 can be formed by depositing a solid electrolyte of an inorganic substance on the surface of the positive electrode active material layer 111 included in the above-mentioned positive electrode 110 by a sputtering method.

Further, the solid electrolyte layer 130 can be formed by applying and drying a paste-like mix containing a solid electrolyte on the surface of the positive electrode active material layer 111 included in the above-mentioned positive electrode 110. After drying, the solid electrolyte layer 130 may be formed by press molding and further pressurizing by a cold isostatic pressing method (CIP).

The laminate 100 can be produced by laminating the negative electrode 120 on the solid electrolyte layer 130 provided on the positive electrode 110 as described above by using a known method so that the negative electrode active material layer 121 comes into contact with the surface of the solid electrolyte layer 130.

Since the CAM having the above configuration uses the LIMO produced by the present embodiment as described above, the gas generation amount of the lithium secondary battery using the CAM can be reduced.

Further, since the positive electrode having the above configuration has a CAM having the above-mentioned configuration, the gas generation amount of the lithium secondary battery can be reduced.

Furthermore, since the lithium secondary battery having the above configuration includes the above-mentioned positive electrode, it is a secondary battery with a small gas generation amount.

EXAMPLES

Next, the present invention will be described in more detail with reference to examples.

<<Composition Analysis>>

The composition analysis of LiMO produced by the method described later was carried out using an inductively coupled plasma emission spectrophotometer (SPS3000 manufactured by SII Nanotechnology Inc.) after the obtained LiMO powder was dissolved in hydrochloric acid.

<<Measurement of Ratio ($I_1/I_2$) of Integral Intensity $I_1$ with Respect to Integral Intensity $I_2$>>

The powder X-ray diffraction measurement was carried out using an X-ray diffractometer (UltimaIV, manufactured by Rigaku Corporation). The LiMO powder was charged onto a specially designed substrate, and the measurement was carried out using a Cu-Kα radiation source under the conditions where the diffraction angle is in the range of $2\theta=10°$ to $90°$, sampling width is $0.02°$, and scan speed is $4°/min$, thereby obtaining a powder X-ray diffraction pattern.

Using the integrated powder X-ray analysis software JADE, the integral intensity $I_1$ in the range of $2\theta=36.7\pm1°$ and the integral intensity $I_2$ in the range of $2\theta=64.9\pm1°$ were obtained from the powder X-ray diffraction pattern, and the ratio ($I_1/I_2$) of the integral intensity $I_1$ with respect to the integral intensity $I_2$ was calculated.

<<Measurement of BET Specific Surface Area>>

The BET specific surface area was measured by using a BET specific surface area meter (for example, Macsorb (registered trademark) manufactured by MOUNTECH Co., Ltd.) after drying 1 g of LiMO powder at 105° C. for 30 min in a nitrogen atmosphere.

<<Measurement of 10% Cumulative Volume Particle Size $D_{10}$ and 50% Cumulative Volume Particle Size $D_{50}$ of LiMO>>

0.1 g of the LIMO powder was added to 50 ml of 0.2% by mass aqueous solution of sodium hexametaphosphate, thereby obtaining a dispersion with the powder dispersed therein. Next, the particle size distribution of the obtained dispersion liquid was measured using Microtrac MT3300EXII (laser diffraction scattering particle size distribution measuring device) manufactured by MicrotracBEL Corporation to obtain a volume-based cumulative particle size distribution curve. Further, from the obtained cumulative particle size distribution curve, when the total cumulative volume is taken as 100%, the value of the particle size at 10% cumulative volume measured from the smallest particle side was determined as the 10% cumulative volume particle size $D_{10}$ (μm), and the value of the particle size at 50% cumulative volume measured from the smallest particle side was determined as the 50% cumulative volume particle size $D_{50}$ (μm).

[Measurement of Average Primary Particle Diameter]

First, the LiMO powder was placed on a conductive sheet attached onto a sample stage, and SEM observation was carried out by radiating an electron beam with an accelerated voltage of 20 kV using a scanning electron microscope (SEM, JSM-5510 manufactured by JEOL Ltd).

50 primary particles in the visual field were selected in an image (SEM photograph) obtained from the SEM observation at magnifications of 5,000 times and 10,000 times, parallel lines were drawn from a certain direction so as to sandwich the projection image of each primary particle, and the distance between the parallel lines (Feret diameter) was measured as the primary particle diameter.

When the number of primary particles in the visual field was less than 50, another visual field was observed until the number of primary particles reached 50, and 50 primary particles were selected.

The arithmetic average value of the obtained primary particle diameters was the average primary particle diameter of the LiMO powder.

<<$D_{50}$/Average Primary Particle Diameter>>

The ratio ($D_{50}$/average primary particle diameter) of the obtained $D_{50}$ with respect to the obtained average primary particle diameter was calculated.

<<Measurement of 10% Cumulative Volume Particle Size $D_{10}$ and 50% Cumulative Volume Particle Size $D_{50}$ of Nickel-Containing MCC>>

0.1 g of the powder of nickel-containing MCC was added to 50 ml of 0.2% by mass aqueous solution of sodium hexametaphosphate, thereby obtaining a dispersion with the powder dispersed therein.

Next, the particle size distribution of the obtained dispersion liquid was measured using Microtrac MT3300EXII (laser diffraction scattering particle size distribution measuring device) manufactured by MicrotracBEL Corporation to obtain a volume-based cumulative particle size distribution curve. Further, from the obtained cumulative particle size distribution curve, when the total cumulative volume is taken as 100%, the value of the particle size at 10% cumulative volume measured from the smallest particle side was determined as the 10% cumulative volume particle size $D_{10}$ (μm), and the value of the particle size at 50% cumulative volume measured from the smallest particle side was determined as the 50% cumulative volume particle size $D_{50}$ (μm).

<<Tamped Density>>

The tap bulk density measured according to JIS R 1628-1997 was taken as the tamped density of the nickel-containing MCC.

<Production of Positive Electrode for Lithium Secondary Battery>

The LiMO obtained by the production method described later, a conductive material (acetylene black) and a binder (PVdF) were added and kneaded so as to achieve a composition of LIMO: conductive material: binder=92:5:3 (mass ratio) to prepare a positive electrode mix in the form of a paste. N-methyl-2-pyrrolidone was used as an organic solvent at the time of preparing the positive electrode mix.

The obtained positive electrode mix was applied to an Al foil having a thickness of 40 μm to serve as a current collector, and vacuum dried at 150° C. for 8 hours to obtain a positive electrode for a lithium secondary battery. The electrode area of the positive electrode for a lithium secondary battery was 1.65 cm².

<Production of Lithium Secondary Battery (Coin-Type Half Cell)>

The following operations were carried out in an argon atmosphere within a glove box.

The positive electrode produced in the section entitled <Production of positive electrode for lithium secondary battery >was placed on a bottom lid of a coin cell for a coin-type battery R2032 (manufactured by Hohsen Corporation) with the aluminum foil surface facing downward, and a laminate film separator (a separator including a heat-resistant porous layer laminated on a polyethylene porous film (thickness: 16 μm)) was placed on the positive electrode. 300 μl of an electrolytic solution was injected thereinto. The electrolytic solution used was prepared by dissolving $LiPF_6$ and vinylene carbonate (VC) in a liquid mixture of ethylene carbonate (hereinafter, sometimes also referred to as "EC"), dimethyl carbonate (hereinafter, sometimes also referred to as "DMC"), and ethyl methyl carbonate (hereinafter, sometimes also referred to as "EMC") at a volume ratio of 16:10:74 such that the amount of $LiPF_6$ becomes 1.3 mol/l and the amount of vinylene carbonate became 1.0%.

Next, metal lithium used as a negative electrode was placed on the laminate film separator, covered with a top lid through a gasket, and swaged using a swage, thereby producing a lithium secondary battery (coin-type half cell R2032, hereinafter sometimes referred to as "half cell").

Using the half cell produced in the section entitled <Production of lithium secondary battery (coin type half cell)>, a float test was carried out under the conditions shown below.

<Evaluation of Gas Generation>

The decomposition electricity amount (hereinafter, may be referred to as "float electricity amount") was measured as a correlation value indicating that gas is less likely to be generated in the battery.

The float electricity amount is the electricity amount observed when an irreversible reaction with the electrolytic solution occurs at the particle interface. Specifically, the float electricity amount indicates the electricity amount when constant voltage charging is continuously performed for 30 hours when fully charged is set to 0.

The larger the value of the observed float electricity amount, the larger the gas generation amount.

In the present embodiment, it was evaluated that the gas generation amount was suppressed when the float electricity amount was 6.0 mAh/g or less.

[Float Test Conditions]

Test temperature: 60° C.

Constant current/constant voltage charging: maximum charge voltage of 4.3V and charge current of 0.2 CA Pause time: 30 hours In the float test, the accumulated electricity amount during the pause time after shifting to the 4.3 V constant voltage mode was calculated as the float electricity amount (mAh/g).

Example 1

1. Production of LiMO 1

After putting water in a reaction vessel equipped with a stirrer and an overflow pipe, an aqueous sodium hydroxide solution was added, and the liquid temperature was maintained at 50° C.

An aqueous nickel sulfate solution, an aqueous cobalt sulfate solution and an aqueous manganese sulfate solution were mixed so that the atomic ratio of nickel atoms, cobalt atoms and manganese atoms was 0.60:0.20:0.20 to prepare a raw material mixture solution.

Next, the raw material mixture solution and an aqueous ammonium sulfate solution as a complexing agent were continuously added to the reaction vessel at a constant rate under stirring so that the ammonia concentration in the reaction vessel became 0.29 mol/L. An aqueous sodium hydroxide solution was appropriately added dropwise so that the pH of the solution in the reaction vessel became 11.3 (measurement temperature: 40° C.) to obtain nickel cobalt manganese composite hydroxide particles. The obtained nickel cobalt manganese composite hydroxide particles were washed and then dehydrated, washed, dehydrated, isolated, and dried to obtain a nickel cobalt manganese composite hydroxide 1. With respect to the nickel cobalt manganese composite hydroxide 1, the tamped density (TD) was 2.38 g/cc, $D_{50}$ was 13.9 μm, and $D_{10}$ was 7.86 μm.

The obtained nickel cobalt manganese composite hydroxide 1, lithium hydroxide weighed so that the amount (molar ratio) of Li with respect to the total amount 1 of Ni, Co, and Mn contained in the obtained nickel cobalt manganese composite hydroxide 1 was 1.20, and potassium sulfate weighed so that the amount (molar ratio) of potassium sulfate with respect to the total amount of lithium hydroxide and potassium sulfate as an inert melting agent was 0.1 were mixed in a mortar to obtain a mixture.

Then, the obtained mixture was calcined at 1000° C. for 10 hours in an oxygen atmosphere and then cooled to room temperature to obtain a calcination product.

The obtained calcination product was crushed in a mortar, dispersed in pure water at 5° C., and then dehydrated. Further, the powder was washed with pure water adjusted to a liquid temperature of 5° C. and then dehydrated, dried at 150° C., and heat-treated by calcining at 760° C. for 5 hours in an atmospheric atmosphere to obtain a powdery LiMO 1.

2. Evaluation of LiMO 1

The composition analysis of the LiMO 1 was performed and the results were applied to the formula (I). As a result, it was found that x=0.013, y=0.199, z=0.197, and w=0.

As a result of powder X-ray diffraction measurement of the LiMO 1. $I_1/I_2$ was 2.87, the BET specific surface area was 0.20 m²/g, $D_{10}$ was 11.3 μm, and the ratio ($D_{50}$/average primary particle diameter) of the 50% cumulative volume particle size $D_{50}$ with respect to the average primary particle diameter was 1.21. Further, the float electricity amount of the coin-type half cell using the LiMO 1 was 5.30 mAh/g.

Example 2

1. Production of LiMO 2

The nickel cobalt manganese composite hydroxide 1 obtained in Example 1, lithium hydroxide weighed so that the amount (molar ratio) of Li with respect to the total amount 1 of Ni, Co. and Mn contained in the obtained nickel cobalt manganese composite hydroxide 1 was 1.20, and potassium sulfate weighed so that the amount (molar ratio) of potassium sulfate with respect to the total amount of lithium hydroxide and potassium sulfate as an inert melting agent was 0.1 were mixed in a mortar to obtain a mixture.

Then, the obtained mixture was heated at 940° C. for 10 hours in an atmospheric atmosphere and then cooled to room temperature to obtain a calcination product.

The obtained calcination product was crushed in a mortar, dispersed in pure water at 5° C., and then dehydrated. Further, the powder was washed with pure water adjusted to a liquid temperature of 5° C. and then dehydrated, dried at 150° C., and heat-treated by calcining at 760° C. for 5 hours in an atmospheric atmosphere to obtain a powdery LiMO 2.

2. Evaluation of LiMO 2

The composition analysis of the LiMO 2 was performed and the results were applied to the formula (I). As a result, it was found that x=0.020, y=0.199, z=0.198, and w=0.

As a result of powder X-ray diffraction measurement of the LiMO 2, $I_1/I_2$ was 2.33, the BET specific surface area was 0.11 m²/g, $D_{10}$ was 5.40 μm, and the ratio ($D_{50}$/average primary particle diameter) of the 50% cumulative volume particle size $D_{50}$ with respect to the average primary particle diameter was 1.52. Further, the float electricity amount of the coin-type half cell using the LiMO 2 was 4.90 mAh/g.

Comparative Example 1

1. Production of LiMO 3

The nickel cobalt manganese composite hydroxide 1 obtained in Example 1, and lithium hydroxide weighed so that the amount (molar ratio) of Li with respect to the total amount 1 of Ni, Co, and Mn contained in the obtained nickel cobalt manganese composite hydroxide 1 was 1.05 were mixed in a mortar to obtain a mixture.

Then, the obtained mixture was calcined at 940° C. for 10 hours in an atmospheric atmosphere without using an inert melting agent and then cooled to room temperature to obtain a calcination product. The obtained calcination product was crushed in a mortar, dispersed in pure water at 5° C. and then dehydrated. Further, the powder was washed with pure water adjusted to a liquid temperature of 5° C. and then dehydrated, and dried at 150° C. to obtain a powdery LiMO 3.

2. Evaluation of LiMO 3

The composition analysis of the LiMO 3 was performed and the results were applied to the formula (I). As a result, it was found that x=−0.006, y=0.198, z=0.196, and w=0.

As a result of powder X-ray diffraction measurement of the LiMO 3, $I_1/I_2$ was 1.87, the BET specific surface area was 0.21 m$^2$/g, $D_{10}$ was 5.64 μm, and the ratio ($D_{50}$/average primary particle diameter) of the 50% cumulative volume particle size $D_{50}$ with respect to the average primary particle diameter was 79.7. Further, the float electricity amount of the coin-type half cell using the LiMO 3 was 9.60 mAh/g.

<Comparative Example 2

1. Production of LiMO 4

The nickel cobalt manganese composite hydroxide 1 obtained in Example 1, and lithium hydroxide weighed so that the amount (molar ratio) of Li with respect to the total amount 1 of Ni, Co. and Mn contained in the obtained nickel cobalt manganese composite hydroxide 1 was 1.10 were mixed in a mortar to obtain a mixture. Then, the obtained mixture was calcined at 850° C. for 10 hours in an atmospheric atmosphere without using an inert melting agent and then cooled to room temperature to obtain a powdery LiMO 4. The obtained calcination product was crushed in a mortar, dispersed in pure water at 5° C., and then dehydrated. Further, the powder was washed with pure water adjusted to a liquid temperature of 5° C. and then dehydrated, and dried at 150° C. to obtain a powdery LiMO 4.

2. Evaluation of LiMO 4

The composition analysis of the LiMO 4 was performed and the results were applied to the formula (I). As a result, it was found that x=0.016, y=0.198, z=0.197, and w=0.

As a result of powder X-ray diffraction measurement of the LiMO 4, $I_1/I_2$ was 1.64, the BET specific surface area was 1.05 m$^2$/g, $D_{10}$ was 6.88 μm, and the ratio ($D_{50}$/average primary particle diameter) of the 50% cumulative volume particle size $D_{50}$ with respect to the average primary particle diameter was 18.3. Further, the float electricity amount of the coin-type half cell using the LiMO 4 was 8.77 mAh/g.

Comparative Example 3

1. Production of LiMO 5

The nickel cobalt manganese composite hydroxide 5 was obtained in the same manner as in Example 1 except that an aqueous nickel sulfate solution, an aqueous cobalt sulfate solution and an aqueous manganese sulfate solution were mixed so that the atomic ratio of nickel atoms, cobalt atoms and manganese atoms was 0.55:0.25:0.30, the obtained raw material mixture solution and an aqueous ammonium sulfate solution as a complexing agent were continuously added to the reaction vessel at a constant rate so that the ammonia concentration in the reaction vessel became 0.27 mol/L, and an aqueous sodium hydroxide solution was appropriately added dropwise so that the pH of the solution in the reaction vessel became 10.6 (measurement temperature: 40° C.) to obtain a nickel cobalt manganese composite hydroxide particles. With respect to the nickel cobalt manganese composite hydroxide 5, the tamped density (TD) was 1.99 g/cc, $D_{50}$ was 7.8 μm, and $D_{10}$ was 2.4 μm.

The obtained nickel cobalt manganese composite hydroxide 5, lithium hydroxide weighed so that the amount (molar ratio) of Li with respect to the total amount 1 of Ni, Co, and Mn contained in the obtained nickel cobalt manganese composite hydroxide 5 was 1.15, and potassium sulfate weighed so that the amount (molar ratio) of potassium sulfate with respect to the total amount of lithium hydroxide and potassium sulfate as an inert melting agent was 0.1 were mixed in a mortar, and then the obtained mixture was calcined at 940° C. for 5 hours in an oxygen atmosphere to obtain a calcination product. The obtained calcination product was put into a pin mill operated at a rotation speed of 14.000 rpm and crushed to obtain a LIMO 5.

2. Evaluation of LiMO 5

The composition analysis of the LIMO 5 was performed and the results were applied to the formula (I). As a result, it was found that x=0.067, y=0.20, z=0.30, and w=0.

As a result of powder X-ray diffraction measurement of the MO 5 $I_1/I_2$ was 1.84, the BET specific surface area was 1.02 m$^2$/g, $D_{10}$ was 1.98 μm, and the ratio ($D_{50}$/average primary particle diameter) of the 50% cumulative volume particle size $D_{50}$ with respect to the average primary particle diameter was 4.64. Further, the float electricity amount of the coin-type half cell using the LiMO 5 was 10.8 mAh/g.

Comparative Example 4

1. Production of LiMO 6

The nickel cobalt manganese zirconium composite hydroxide 6 was obtained in the same manner as in Example 1 except that an aqueous nickel sulfate solution, an aqueous cobalt sulfate solution, an aqueous manganese sulfate solution and an aqueous zirconium sulfate solution were mixed so that the atomic ratio of nickel atoms, cobalt atoms, manganese atoms and zirconium atoms was 0.547:0.199: 0.249:0.005, the obtained raw material mixture solution and an aqueous ammonium sulfate solution as a complexing agent were continuously added to the reaction vessel at a constant rate so that the ammonia concentration in the reaction vessel became 0.17 mol/L, and an aqueous sodium hydroxide solution was appropriately added dropwise so that the pH of the solution in the reaction vessel became 12.0 (measurement temperature: 40° C.). With respect to the nickel cobalt manganese zirconium composite hydroxide 6, the tamped density (TD) was 1.11 g/cc, $D_{50}$ was 3.1 μm, and $D_{10}$ was 2.05 μm.

The nickel cobalt manganese zirconium composite hydroxide 6, and lithium hydroxide weighed so that the amount (molar ratio) of Li with respect to the total amount 1 of Ni, Co, and Mn contained in the obtained nickel cobalt manganese zirconium composite hydroxide 1 was 1.03 were mixed, and then the obtained mixture was calcined at 650° C. for 5 hours in an oxygen atmosphere without using an inert melting agent and then cooled to room temperature to obtain a primary calcination powder. The obtained primary calcination powder was calcined at 970° C. for 5 hours in an oxygen atmosphere to obtain a LiMO powder. The obtained LiMO powder was put into a pin mill operated at a rotation speed of 14.000 rpm and crushed to obtain a LiMO 6.

2. Evaluation of LiMO 6

The composition analysis of the LIMO 6 was performed and the results were applied to the formula (I). As a result, it was found that x=0.018, y=0.198, z=0.247, and w=0.004.

As a result of powder X-ray diffraction measurement of the LiMO 6, $I_1/I_2$ was 2.28, the BET specific surface area was 0.77 $m^2/g$, $D_{10}$ was 2.03 μm, and the ratio ($D_{50}$/average primary particle diameter) of the 50% cumulative volume particle size $D_{50}$ with respect to the average primary particle diameter was 2.05. Further, the float electricity amount of the coin-type half cell using the LiMO 6 was 7.14 mAh/g.

TABLE 1

| | $I_1/I_2$ | BET specific surfaec area $[m^2/g]$ | $D_{10}$ [μm] | Average primary particle diameter [μm] | $D_{50}$/ Average primary particle diameter | Float electricity amount [mAh/g] |
|---|---|---|---|---|---|---|
| Ex. 1 | 2.87 | 0.20 | 11.3 | 15 | 1.21 | 5.30 |
| Ex. 2 | 2.33 | 0.11 | 5.40 | 6.4 | 1.52 | 4.90 |
| Comp. Ex. 1 | 1.87 | 0.21 | 5.64 | 0.22 | 79.7 | 9.60 |
| Comp. Ex. 2 | 1.64 | 1.05 | 6.88 | 0.64 | 18.3 | 8.77 |
| Comp. Ex. 3 | 1.84 | 1.02 | 1.98 | 0.81 | 4.64 | 10.8 |
| Comp. Ex. 4 | 2.28 | 0.77 | 2.03 | 1.7 | 2.05 | 7.14 |

As shown in the above results it was confirmed that in Examples 1 and 2 to which the present invention was applied, the float electricity amount was 6.0 mAh/g or less, and the gas generation amount was suppressed.

REFERENCE SIGNS LIST

1: Separator; 2: Positive electrode; 3: Negative electrode; 4: Electrode group; 5: Battery can; 6: Electrolytic solution; 7: Top insulator; 8: Sealing body; 10: Lithium secondary battery; 21: Positive electrode lead; 31: Negative electrode lead; 100: Laminate; 110: Positive electrode; 111: Positive electrode active material layer; 112: Positive electrode current collector; 113: External terminal; 120: Negative electrode; 121: Negative electrode active material layer; 122: Negative electrode current collector; 123: External terminal; 130: Solid electrolyte layer; 200: Exterior body; 200a: Opening; 1,000; All-solid-state lithium secondary battery

The invention claimed is:

1. A lithium metal composite oxide represented by the following composition formula (I), the lithium metal composite oxide satisfies requirements (1) to (3):

$$Li[Li_x(Ni_{1-y-z-w}Co_yMn_zM_w)_{1-x}]O_2 \qquad (I)$$

wherein M is one or more elements selected from the group consisting of P, Fe, Cu, Ti, Mg, Al, W, B, Mo, Nb, Zn, Sn, Zr, Ga and V, and −0.1≤x≤0.2, 0≤y≤0.4, 0≤z≤0.4 and 0≤w≤0.1 are satisfied;

(1) a ratio ($I_1/I_2$) of an integral intensity $I_1$ of a diffraction peak in a range of 2θ=36.7±1° with respect to an integral intensity $I_2$ of a diffraction peak in a range of 2θ=64.9±1° in a powder X-ray diffraction measurement for the lithium metal composite oxide using Cu-Kα ray is 2.0 or more;

(2) a BET specific surface area is 0.7 $m^2/g$ or less; and (3) a 10% cumulative volume particle size $D_{10}$ is 5 μm or more, and wherein the lithium metal composite oxide that satisfies the requirements (1) to (3) has been washed with a washing liquid containing water.

2. The lithium metal composite oxide according to claim 1, wherein a ratio ($D_{50}$/average primary particle diameter) of a 50% cumulative volume particle size $D_{50}$ with respect to an average primary particle diameter is 2.0 or less.

3. The lithium metal composite oxide according to claim 1, wherein an average primary particle diameter is 4.5 μm or more.

4. The lithium metal composite oxide according to claim 1, wherein y is 0.5 times or more and 5 times or less of z in the composition formula (I).

5. A positive electrode active material for a lithium secondary battery, which comprises the lithium metal composite oxide of claim 1.

6. A positive electrode for a lithium secondary battery, which comprises the positive electrode active material of claim 5.

7. A lithium secondary battery comprising the positive electrode of claim 6.

\* \* \* \* \*